(12) United States Patent
Ramakrishnan et al.

(10) Patent No.: US 11,996,988 B1
(45) Date of Patent: May 28, 2024

(54) REINFORCED COMPUTER LEARNING SYSTEM AND METHOD FOR MINIMIZING POWER CONSUMED BY UNDERUTILIZED DATA CENTER HARDWARE COMPONENTS

(71) Applicant: Dell Products, LP, Round Rock, TX (US)

(72) Inventors: Malathi Ramakrishnan, Tamil Nadu (IN); Ramesh Doddaiah, West Borough, MA (US); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/140,285

(22) Filed: Apr. 27, 2023

(51) Int. Cl.
  *G06F 15/173* (2006.01)
  *H04L 41/16* (2022.01)
  *H04L 43/08* (2022.01)
  *H04L 67/1012* (2022.01)

(52) U.S. Cl.
  CPC .............. *H04L 41/16* (2013.01); *H04L 43/08* (2013.01); *H04L 67/1012* (2013.01)

(58) Field of Classification Search
  CPC ...... H04L 41/16; H04L 43/08; H04L 67/1012
  See application file for complete search history.

(56) References Cited

U.S. PATENT DOCUMENTS

| 8,185,909 | B2 | 5/2012 | Sigal |
| 8,626,450 | B2 | 1/2014 | Dooley |
| 9,183,327 | B2 | 11/2015 | Keeli |
| 9,210,100 | B2* | 12/2015 | Van Der Linden ......... H04L 67/1097 |
| 9,760,474 | B2 | 9/2017 | Pillai |
| 10,652,327 | B2* | 5/2020 | Nidugala ............ H04L 41/0897 |

(Continued)

FOREIGN PATENT DOCUMENTS

| EP | 2006770 B1 | 1/2014 |
| WO | 2011/106160 A2 | 9/2011 |

OTHER PUBLICATIONS

C. Herrmann, et al., "Sustainability as Strategic Business Model for Profitable Business," 7 pages, May 2014.

(Continued)

*Primary Examiner* — Padma Mundur
(74) *Attorney, Agent, or Firm* — Prol Intellectual Property Law, PLLC; H. Kenneth Prol

(57) ABSTRACT

An information handling system executing a reinforcement learning (RL) based data center power consumption minimizing system may comprise a network interface device to receive operational telemetry measurements for a plurality of data center processors forming a processing node, including performance and utilization analytics, and a user-specified low-utility threshold value, a hardware processor to predict a future time window in which a utilization rate for the processing node executing a future workload falls below the user-specified low-utility threshold value, the hardware processor to identify an optimal load-balancing instruction for redistributing the future workload across a sub-portion of the processing system associated with a highest reward value for satisfying quality of service (QoS) requirements, and the network interface device to transmit the optimal load-balancing instruction and an instruction to throttle power supplied to a remainder of the processing system.

20 Claims, 8 Drawing Sheets

(56) References Cited

U.S. PATENT DOCUMENTS

| | | |
|---|---|---|
| 2004/0024861 A1 | 2/2004 | Coughlin |
| 2008/0046895 A1 | 2/2008 | Dillenberger |
| 2009/0276388 A1 | 11/2009 | Donohue |
| 2009/0292617 A1 | 11/2009 | Sperling |
| 2010/0070404 A1 | 3/2010 | McConnell |
| 2010/0235654 A1* | 9/2010 | Malik .................... G06F 1/324 |
| | | 713/300 |
| 2014/0100937 A1 | 4/2014 | Na |
| 2014/0181834 A1 | 6/2014 | Lim |
| 2014/0316964 A1 | 10/2014 | Slutsker |
| 2017/0123857 A1 | 5/2017 | Khan |
| 2021/0004328 A1 | 1/2021 | Wang |
| 2022/0171665 A1* | 6/2022 | Baughman ............ G06F 9/5094 |
| 2022/0334874 A1* | 10/2022 | Katiyar ................... G06F 9/542 |
| 2024/0012685 A1* | 1/2024 | Sousa ................... G06F 9/5027 |

OTHER PUBLICATIONS

A. Stenhall, "What is the carbon footprint of a typical corporate laptop?," 6 pages, Oct. 25, 2020.

K. Abnett, et al., "EU proposes world's first carbon border tax for some imports," 14 pages, Jul. 14, 2021.

* cited by examiner

REINFORCED COMPUTER LEARNING SYSTEM AND METHOD FOR MINIMIZING POWER CONSUMED BY UNDERUTILIZED DATA CENTER HARDWARE COMPONENTS

FIELD OF THE DISCLOSURE

The present disclosure generally relates to minimizing an amount of greenhouse gas emissions that may be attributable to operation of a data storage system or data center. More specifically, the present disclosure relates to a reinforcement learning (RL) based data center power consumption minimizing system for identifying an optimal load-balancing method for identifying and redistributing workload for hardware components at a data center that are predicted to be underutilized during an upcoming time window and throttling power to the underutilized hardware component, to minimize CO2 emissions due to operation of such underutilized hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
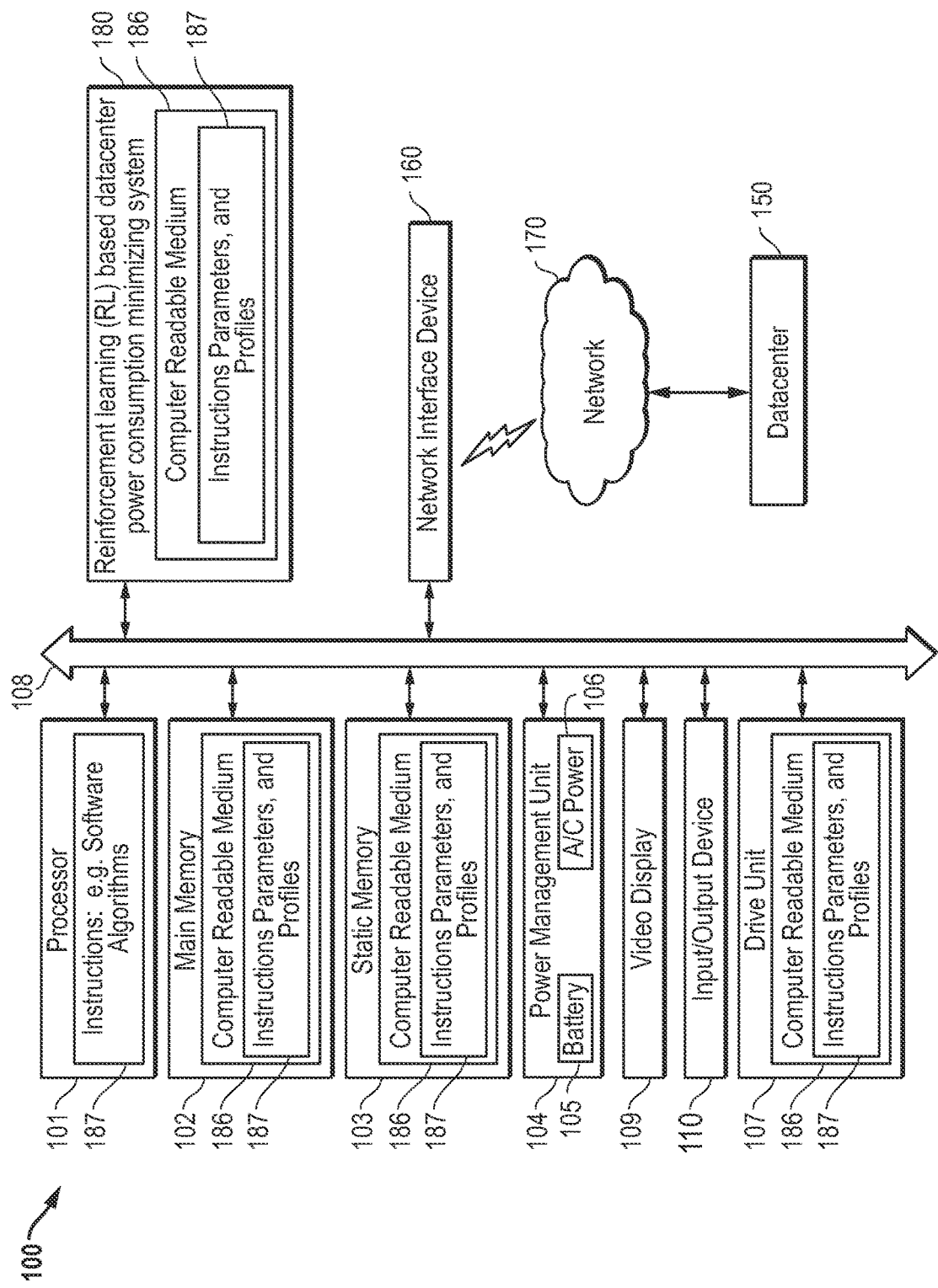
FIG. 1 is a block diagram illustrating a cloud-based Unified Endpoint Management (UEM) platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Load-balancing of processing requests across enterprise data storage systems (e.g., including one or more data centers) comprising a plurality of hardware components executing memory accessing functions (e.g., servers) and across several time windows is regularly used for efficient operation of server farms, or data centers for cloud computing providers, data storage, and for customers. Client information handling systems (e.g., host computers) serviced by such enterprise systems often access many different data storage systems (e.g., one or more data centers), or portions thereof (e.g., specific servers) in various locations. A data storage system in embodiments of the present disclosure may comprise one or more data centers, and each data center within a data storage system may be located in a different geographic area than other data centers. Many systems exist for optimizing distribution of memory accessing functions or processing requests across a plurality of such data centers located in various places in order to maximize the speed, efficiency, or throughput (e.g., number of calls processed within a set period of time) of the overall enterprise system or across all hardware components of an enterprise data storage system, referred to herein as data storage system/data center(s). However, a system for identifying and predicting such distribution functionality so as to minimize carbon dioxide (CO2) or other greenhouse gas (GHG) emissions is needed.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including various hardware components within data storage system/data center(s), such as servers, computing nodes, storage engines, storage arrays, fabric connections, or managed drives operated within one or more data centers for a larger enterprise system. GHGs emitted by any given hardware component of the data storage system/data center(s) within an enterprise network may be dependent upon power consumed during operation of the hardware component, which may in turn be dependent on the workload placed on each hardware component. Many hardware components, such as memory hardware (e.g., storage arrays, managed drives), processors (e.g., central processing units (CPUs), graphics processing units (GPUs) within storage engines or computing nodes), or peripheral component interconnect express (PCIe) cards or other application-specific integrated circuit (ASIC) cards, sometimes referred to herein as slics, that service network paths (e.g., fabric connections) may receive constant power supply, regardless of whether the components are actually used. For example, an ASIC-based card may service one or more functions for a network fabric connections as a computing node back-end communication adapter. A solution is needed to power down and, if necessary, reroute tasks away from hardware components predicted to be underutilized during an upcoming time window, in order to limit unnecessary power consumption and consequent carbon emissions by these underutilized hardware components by powering down capacity.

The reinforcement learning (RL) based data center power consumption minimizing system in embodiments of the present disclosure addresses these issues by identifying hardware components that are predicted to be underutilized during an upcoming time window, powering down those components during the upcoming time window, and using an RL-based method to identify an optimal load-balancing technique for rerouting any input/output (IO) commands directed to the underutilized component(s) that may be powered down to other alternative hardware components. First, the RL based data center power consumption minimizing system in embodiments herein may train a time-series utilization forecasting engine to predict a future utilization rate for each of a plurality of data center hardware components by group (e.g., memory hardware, processors, PCIE card or other ASIC card, fabric network paths), based on previously recorded utilization rates for each of the plurality of component groups. PCIE card or other ASIC-based card may operate as computing node back-end communication adapters to service one or more fabric network paths in example embodiments. Such a utilization forecasting engine may then be used during a monitoring period to predict future utilization rates for each of these hardware component groups and to identify low-utilization windows when such utilization rates may fall below a user-defined low-utilization threshold specific to each hardware component group.

The RL based data center power consumption minimizing system in embodiments may also train a power-throttling learning module, based on operational telemetry measurements of the plurality of data center hardware components (e.g., of a plurality of hardware types), including workload metrics, load-balancing instructions available for deployment that affect workload directed to such hardware components, and quality of service (QoS) requirements for hardware components. Such QoS requirements may include, for example, a maximum allowable response time for processing of an IO command. In embodiments, the power-throttling learning module may be trained to determine a probability that each available load-balancing instruction will affect the ability of one or more data center hardware components, other than the underutilized component(s) to meet QoS requirements. In other words, the power-throttling learning module may be trained to determine, for each hardware component to which a portion of the underutilized hardware component's workload may be diverted, a probability that this diverted workload may compromise the ability of the hardware component receiving the diverted workload to meet its user-defined QoS requirements. In such a way, the power-throttling learning module may be trained to model a relationship between each of a plurality of load-balancing techniques and an ability for any given component receiving supplemental workload due to execution of any one of these load-balancing techniques to meet QoS requirements.

During a monitoring period, following training of the utilization forecasting engine and the power-throttling learning module, the utilization forecasting engine may notify the power-throttling learning module that a utilization rate for a hardware component type (e.g., memory, processors, PCIe or other ASIC cards) is predicted to fall below a user-defined low-utilization threshold value. This may indicate a need to power down one or more data center hardware components within the predicted underutilized hardware group during a predicted low-utilization window. For example, a notification that memory hardware may be underutilized during an upcoming time window may indicate a need to switch off one or more managed drives, or one or more storage arrays. In turn, such a power-throttling of these managed drives or storage arrays may indicate a further need to monitor and potentially reroute some of the minimal workload expected or any unexpected workload at these managed drives or storage arrays to which power may be ceased to other managed drives, storage arrays, or even data centers expected to maintain full power during the upcoming time window, according to load-balancing instructions.

The power-throttling learning module in embodiments herein may respond by identifying an optimal load-balancing instruction for diverting the minimal workload expected or any unexpected workload at the underutilized hardware component (e.g., one or more managed drives or storage arrays) that may be powered down or have otherwise reduced capacity to fully powered alternative managed drives, storage arrays, or data centers that meets all QoS requirements for the alternative managed drives, storage arrays, or data centers. In embodiments herein, the power-throttling learning module may use the trained model described herein to identify the load-balancing instruction for diverting the minimal workload or any unexpected workload to fully powered alternative managed drives, storage arrays, or data centers that has the highest probability of meeting all QoS requirements for the original hardware components that may be powered down or have otherwise reduced capacity. The RL based data center power consumption minimizing system in embodiments herein may then transmit a recommendation or instruction to the data center housing the predicted underutilized hardware component group to power-down or place into sleep mode one or more hardware components (e.g., managed drives or storage arrays) within the predicted underutilized hardware component group (e.g., memory). The RL based data center power consumption minimizing system may also transmit the optimal load-balancing instruction to divert any expected workload away from the powered down hardware component(s) toward fully powered alternative hardware components having the highest likelihood of meeting all QoS requirements of such a workload at the powered down components (e.g., response times or capacity). In such a way, the RL based data center power consumption minimizing system may predict and decrease power consumed and CO2 emitted by underutilized data center hardware components, while continuing to meet all QoS requirements of host information handling systems utilizing the enterprise data storage system with the data center hardware components remaining fully powered.

FIG. 1 illustrates an information handling system 100 according to several aspects of the present disclosure. As described herein, an information handling system 180 may execute code instructions of a Reinforcement Learning (RL) based data center power consumption minimizing system 180 operating at a Unified Endpoint Management (UEM) platform information handling system to identify hardware components of a data storage system/data center 150 that are predicted to be underutilized during an upcoming time window, power down that component during the upcoming time window, and use an RL-based method to identify an optimal load-balancing technique for determining and potentially rerouting any input/output (IO) commands directed to the underutilized component to other alternative hardware components. Some or all of portions and components information handling system 100 in FIG. 1 may also represent one or more portions of a data storage system/data center(s) 150 (e.g., computing nodes or storage engines as described in greater detail below with respect to FIG. 2) according to embodiments herein, and information handling system 100 may also serve as a UEM platform device, or a data storage system/data center(s) managing the data storage system/data center(s) 150 hardware components, according to various embodiments herein. Data storage system/data center(s) 150 hardware components operational telemetry measurements including hardware component utilization rates, performance analytics, available load-balancing actions, user-specified low-utility threshold values, and user-specified Quality of Service (QoS) requirements may be gathered during routine monitoring periods from a plurality of data storage system/data center(s) 150 hardware components, and the data storage system/data center(s) 150 managing such components to the UEM platform 100 executing the RL based data center power consumption minimizing system 180. Power consumption levels for data storage system/data center(s) hardware components including information handling systems 100 operating as compute nodes, storage arrays, or other components at one or more data centers may be measured and reported by a power management unit (PMU) 104 and provided in correlation with memory accessing functions being executed according to embodiments herein. PMU 104 may include a power management controller or other processor to monitor power consumption levels by data storage system/data center(s) 150 hardware components and report that with correlation to executing memory accessing functions according to embodiment of the present disclosure. Some or all of the information handling system 100 of FIG. 1 may operate at a UEM platform information handling system or as a portion of a data storage system/data center(s) 150 according to various embodiments herein. The UEM platform 100 in an embodiment may manage power consumed by underutilized hardware components of the data center 150 and reroute workload away from such underutilized hardware components in a manner that meets all QoS requirements for all hardware components of the data storage system/data center 150.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory (RAM), dynamic RAM (DRAM), etc.), nonvolatile memory (read-only memory, flash memory, non-volatile RAM (NVRAM), etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the RL based data center power consumption minimizing system 180, the wireless network interface device 160, a static memory 103 or drive unit 107, a, a video display 109, or other components of an information handling system. The PMU 104 may also include a controller to measure and report power consumption by one or more components of an information handling system such as the data storage system/data center(s) 150 hardware components. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the RL based data center power consumption minimizing system 180, that may operate on servers or systems, remote data centers, or on-box in individual data storage system/data center(s) 150 hardware components according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Such a hardware processor 101 in an embodiment may be referred to herein as a "local" processor, as it is "local" to the UEM platform of which the information handling system 100 may comprise all or a part. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system with processing resources executing code instructions of a RL based data center power consumption minimizing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing code instructions for systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to identify data center 150 hardware components that are predicted to be underutilized during an upcoming time window, power down those component during the upcoming time window, and use an RL-based method to identify an optimal load-balancing technique for rerouting any input/output (TO) commands directed to the underutilized component to other hardware components of the same data center 150 or an alternate data center and to meet host information handling systems QoS requirements for those IO commands. For example, instructions 187 may include a particular example of an RL based data center power consumption minimizing system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The RL based data center power consumption minimizing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the RL based data center power consumption minimizing system 180, firmware or software algorithms, processes, and/or methods may be stored here. Such code instructions 187 may comprise forecasting a future utilization rate across a plurality of data storage system/data center(s) 150 hardware components and to power down and reroute workload away from these predicted underutilized components. The RL based data center power consumption minimizing system 180 may operate on hardware processing resources within a Unified Endpoint Management (UEM) platform 100 that gathers telemetries from a plurality of data storage system/data center(s) 150 hardware components via the network 170 that describe operating environments for those data storage system/data center(s) 150 hardware components. The UEM platform 100 in an embodiment may operate to identify information technology (IT) issues at data storage system/data center(s) 150 hardware components, and to provide support for such issues, including automatically updating drivers or hardware components, as needed. The UEM platform in an embodiment may operate as a cloud-based service to store data (e.g., operating environment telemetries for remote data storage system/data center(s) 150 hardware components) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the RL based data center power consumption minimizing system 180 may be stored in static memory 103, or the drive unit 107 on a computer-readable medium 186 such as a flash memory or magnetic disk in an example embodiment. More specifically, telemetries describing power consumption and workloads for data storage system/data center(s) 150 hardware components may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express (PCIe) card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
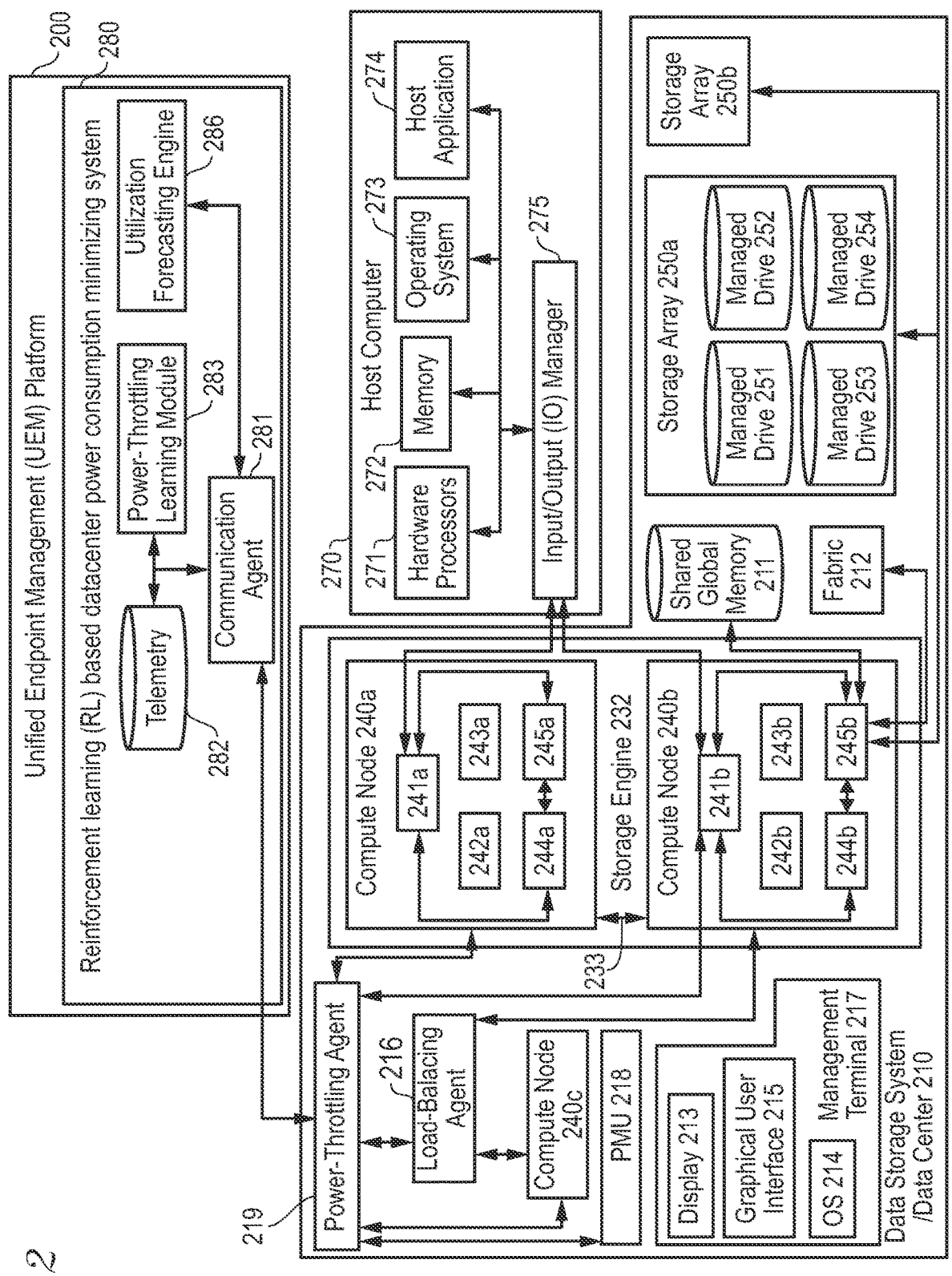
FIG. 2 is a block diagram illustrating a reinforced learning (RL) based data center power consumption minimizing system executing on a UEM information handling system to manage an enterprise data storage system with one or more data center(s) according to an embodiment of the present disclosure.

FIG. 2 is a block diagram illustrating a reinforcement learning (RL) based data center power consumption minimizing system 280 executing on a unified endpoint management (UEM) platform 200 information handling system for identifying data storage system/data center 210 hardware components that are predicted to be underutilized during an upcoming time window, powering down those components during the upcoming time window, and using an RL-based method to identify predicted load-balancing instructions for rerouting any input/output (IO) commands from being directed to the underutilized component(s) to other alternative optimal hardware components that will meet 10 command QoS requirements of a host information handling system. By powering down these underutilized data center 210 hardware components, execution of code instructions for the RL based data center power consumption minimizing system may minimize the power consumed and $CO_2$ emitted due to unnecessary power supply to these underutilized components. As described herein, a data storage system 210 in various embodiments herein may comprise one or more data centers, and each data center within a data storage system having multiple data centers may be located in a different geographic area than other data centers. Each data center (e.g., 210) in an example embodiment may comprise at least one compute node (e.g., 240a), a load-balancing agent 216, a power-throttling agent 219, a management terminal 217, and at least one storage array 250a. These data storage system hardware components each may be explained in greater detail below.

In an embodiment, the data storage system/data center(s) 210 may provide data storage services for a plurality of host computers (e.g., 270), which may comprise one or more hardware processors 271, a local-to-host memory 272, an operating system 273, and one or more host applications 274. The processor(s) 271 in an embodiment may comprise one or more multi-core processors including central processing unit (CPU), graphics processing unit (GPU), or combinations thereof. The local-to-host memory 272 in an embodiment may include volatile memory (e.g., Random Access Memory (RAM) of any type), or tangible persistent storage components of one or more technology types (e.g., Solid State Drives (SSDs), Hard Disk Drives (HDDs), Storage Class Memory (SCM), Enterprise Flash Drives (EFDs), Serial Advanced Technology Attachment (SATA) drives, or Fiber Channel (FC) drives. The host computer 270 in an embodiment may support multiple virtual hosts running on virtual machines or containers. In some embodiments, host computer 270 may be implemented as a virtual machine within storage system 210.

In an embodiment, the host application 274 may comprise any type of software directing the hardware processor 271 to access data stored in memory either locally (e.g., at 272 comprising volatile memory or persistent storage), or within the data storage system/data center(s) 210. More specifically, host application 273 in an example embodiment may include file servers, e-mail servers, block servers, software development testbeds, or databases. The data storage system/data center(s) 210 in an embodiment may maintain data for the host application 274 running on the host computer 270. For example, host application 274 may write data of the host application 274 to the data storage system/data center(s) 210 and read data of host application 274 from the data storage system/data center(s) 210, via an input/output (IO) manager 275, in order to perform various functions. The host application 274 at the host computer 270 may be that of a user or customer, such as within an enterprise, who utilizes the resources of the data storage system/data center(s) 210.

The data storage system/data center(s) 210 in an embodiment may comprise one or more storage engines (e.g., 232), which may each further comprise one or more compute nodes 240a, or 240b, possibly including but not limited to storage servers and storage directors for providing data storage services. For example, storage engine 232 in an embodiment may comprise compute nodes 240a and 240b. In some embodiments, pairs of the compute nodes (e.g., 240a and 240b) are organized within a storage engine (e.g., 232), for purposes of facilitating failover between compute nodes (e.g., between 240a and 240b) within storage system 210. In some embodiments, the paired compute nodes (e.g., 240a and 240b) of each storage engine (e.g., 232) are directly interconnected by communication links (e.g., 233). As used herein, the term "storage engine" will refer to a storage engine, such as storage engine 232, which has a pair of (two independent) compute nodes (e.g., 240a and 240b). A given storage engine (e.g., 232) is implemented using a single physical enclosure and provides a logical separation between itself and other storage engines of the storage system 210. A given storage system 210 may include one or more of such storage engines (e.g., 232). Storage engine compute nodes 240a and 240b may include processing resources such as peripheral component interconnect express (PCIe) cards or other application-specific integrated circuit (ASIC) cards as well as one or more hardware processors in various embodiments. PCIe or other ASIC cards may include compression hardware cards, deduplication hardware cards, and encryption hardware cards, fabric interconnect hardware cards, or other ASIC based hardware system for operation at data storage system/data center 210. These ASIC based hardware systems may be referred to as slics for various network fabric portions within the data storage system/data center(s) 210. PCIE card or other ASIC-based card may operate as computing node back-end communication adapters to service one or more fabric network paths in example embodiments.

Each compute node (e.g., 240a, or 240b), includes processors (e.g., 242a or 242b) and a local-to-node volatile memory (e.g., 243a, or 243b). The processors (e.g., 242a or 242b) may include a plurality of multi-core processors of one or more types, e.g., including multiple central processing units (CPUs), graphics processing units (GPUs), PCIe or other ASIC hardware cards and combinations thereof. Each processor (e.g., 242a or 242b) of the data storage system/data center(s) 210 in an embodiment may be referred to herein as "local-to-data storage system," indicating location of that processor within the data storage system/data center(s) 210, or "local-to-node," indicating location of the processor within a computing node (e.g., 242a or 242b, respectively) of the data storage system/data center(s) 210. Processors (e.g., 242a, or 242b) referred to herein as "local-to-data storage system," or "local-to-node," in such a manner may also be considered as remote hardware processors from the perspective of the UEM platform 200, in that the hardware processors (e.g., 242a or 242b) located at the data storage system/data center(s) 210 in an embodiment may be located "remotely" from the UEM platform 200.

The local-to-node volatile memory (e.g., 243*a*, or 243*b*) may include, for example and without limitation, any type of RAM. Each compute node (e.g., 240*a*, or 240*b*) may also include one or more front end adapters (e.g., 241*a*, or 241*b*, respectively) for communicating with the host computer 270, a power-throttling agent 219, and a load-balancing agent 216 of the data storage system/data center(s) 210. Each compute node (e.g., 240*a*, or 240*b*) may also include one or more back-end adapters (e.g., 245*a*, or 245*b*, respectively) for communicating with respective associated back-end drive arrays (e.g., 250*a*, or 250*b*), thereby enabling access to managed drives (e.g., 251, 252, 253, or 254). A given storage system 210 may include one back-end drive array (e.g., 250*a*) or multiple back-end drive arrays (e.g., 250*a* and 250*b*). Each compute node (e.g., 240*a* or 240*b*) may also control one or more network paths via these front end adapters (e.g., 241*a* or 241*b*) and back-end adapters (e.g., 245*a*, or 245*b*). The front end and back end adapters (e.g., 241*a* and 245*a*, or 241*b* and 245*b*, respectively) for example may comprise a PCIe or other ASIC card, and other slic components operating to route incoming IO commands and outgoing responses (if any) between the memory hardware (e.g., storage arrays and managed drives) of the data storage system/data center 210 and the host computer 270 to conduct compression, encryption, or other functions on data in response to IO commands. PCIE card or other ASIC-based card may operate as computing node back-end communication adapters to service one or more fabric network paths in example embodiments. Each incoming IO command may utilize a fabric network path that includes at least one compute node (e.g., 240*a*, or 240*b*), one PCIe card or other ASIC card (e.g., 245*a* or 245*b*), fabric 212, and a memory hardware component (e.g., storage array 250*a* or 250*b*, or managed drives 251, 252, 253, or 254). In some cases, particular fabric network paths, PCIe cards or other ASIC cards (e.g., 245*a*, or 245*b*) may be dedicated to particular types of tasks, such as compression, deduplication, or encryption.

In some embodiments, managed drives (e.g., 251, 252, 253, or 254) are storage resources dedicated to providing data storage to storage system 210 or are shared between a set of storage systems (e.g., 210). Managed drives (e.g., 251, 252, 253, or 254) may be implemented using numerous types of memory technologies for example and without limitation any of the SSDs and HDDs mentioned above. In some embodiments the managed drives (e.g., 251, 252, 253, or 254) are implemented using NVM (Non-Volatile Memory) media technologies, such as NAND-based flash, or higher-performing SCM (Storage Class Memory) media technologies such as 3D XPoint, dynamic RAM (DRAM), and ReRAM (Resistive RAM). Managed drives (e.g., 251, 252, 253, or 254) may be directly connected to the compute nodes (e.g., 240*a* or 240*b*) using a PCIe (Peripheral Component Interconnect Express) bus or may be connected to the compute nodes (e.g., 240*a* or 240*b*) for example, by an IB (InfiniBand) bus or fabric.

In some embodiments, each compute node (e.g., 240*a* or 240*b*) also includes one or more channel adapters (e.g., 244*a*, or 244*b*, respectively) for communicating with other compute nodes directly or via an interconnecting fabric 212. An example interconnecting fabric 212 may be implemented using InfiniBand. Each compute node (e.g., 240*a* or 240*b*) may allocate a portion or partition of its respective local-to-node volatile memory (e.g., 243*a*, or 243*b*, respectively) to a virtual shared "global" memory 211 that can be accessed by other compute nodes (e.g., 240*a* or 240*b*), e.g., via DMA (Direct Memory Access) or RDMA (Remote Direct Memory Access). Shared global memory 211 will also be referred to herein as the cache of the storage system 210.

As described herein, the data storage system/data center(s) 210 maintains data for the host applications 274 running on one or more enterprise host computers (e.g., 270). Logical storage devices are created and presented to the host application 274 for storage of the host application 274 data. The host memory 272 is a single data storage device having a set of contiguous fixed-size LBAs (Logical Block Addresses) on which data used by the host application 274 resides and can be stored. However, the data used by the host application 274 and the storage resources available for use by the host application 274 may actually be maintained by the compute nodes (e.g., 240*a*, or 240*b*) at non-contiguous addresses (tracks) on various different managed drives (e.g., 251, 252, 253, or 254), compute node memories (e.g., 243*a* or 243*b*), or the shared global memory 211 within data storage system/data center(s) 210.

In some embodiments, the data storage system/data center(s) 210 maintains metadata that indicates, among various things, mappings between the memory 272 of the host computer 270 and the locations of extents of host application data in the managed drives (e.g., 251, 252, 253, or 254), compute node memories (e.g., 243*a* or 243*b*), or the shared global memory 211. In response to an IO (Input/Output command) generated at the host application 274 in an embodiment, the operating system (OS) 273 may determine whether the command can be serviced by accessing the host memory 272 based on metadata for data classification type or QoS requirements provided from the host application 274 or policy settings of the host information handling system 270 or the data center 210. If that is not possible, then the OS 273 prompts the IO manager 275 to transmit the IO command to one of the compute nodes (e.g., 240*a*, or 240*b*) to be serviced by the data storage system/data center(s) 210.

There may be multiple paths between the host computer 270 and the storage system 210, e.g., one path per front end adapter (e.g., 245*a* or 245*b*). The paths may be selected based on a wide variety of techniques and algorithms including, performance, load balancing, and CO2 minimization techniques. In the case where IO manager 275 generates a read command, the storage system 210 uses metadata to locate the commanded data, e.g., in the managed drives (e.g., 251, 252, 253, or 254), compute node memories (e.g., 243*a* or 243*b*), or the shared global memory 211 and may include QoS requirements such as response time, capacity, or the like. If the commanded data is not in the virtual shared global memory 211, then the data in an embodiment may be temporarily copied into the virtual shared global memory 211 from the managed drives (e.g., 251, 252, 253, or 254), or compute node memories (e.g., 243*a* or 243*b*) and sent to the host application 274 by the front-end adapter (e.g., 245*a* or 245*b*) of one of the compute nodes (e.g., 240*a* or 24*b*, respectively). In the case where the IO manager 275 generates a write command, in some embodiments the storage system 210 in an embodiment may copy a block being written into the virtual shared global memory 211 and create new metadata that maps the address of the data on the virtual shared global memory 211 to a location to which the block is written on the managed drives (e.g., 251, 252, 253, or 254) and may include QoS requirements such as capacity, fabric latency, or the like. The virtual shared global memory 211 in an embodiment may enable the block written on the managed drives (e.g., 251, 252, 253, or 254) to be reachable via all of the compute nodes (e.g., 240*a*, or 240*b*) and paths, although the storage system 210 can be configured to limit use of certain paths to certain compute nodes. The data storage system/data center(s) 210 in an embodiment may further comprise a display 213 for display of a graphical user interface 215, as well as an operating system 214.

The execution of code instructions of a power-throttling agent 219 on one or more hardware processors (e.g., 242a or 242b) at the data center 210 in an embodiment may operate to gather operational telemetry describing operational functionality of the various components of the data storage system/data center(s) 210, including the storage engine(s) 232, compute nodes 240a, and 240b, compute node processors 242a and 242b, compute node memories 243a and 243b, local-to-node volatile memories 244a and 244b, back-end adapters 245a or 245b, fabric 212, storage arrays 250a and 250b, shared global memory 211, and managed drives 251, 252, 253, and 254. The power-throttling agent 219 in an embodiment may be in communication with the various hardware components of the data storage system/data center(s) 210 (e.g., storage engine 232, computing nodes 240a or 240b, compute node processors 242a or 242b, compute node memories 243a or 243b, compute node backend adapters 245a or 245b, local-to-node volatile memories 244a or 244b, shared global memory 211, fabric 212, storage arrays 250a or 250b, and managed drives 251, 252, 243, or 254) and firmware for those components in an embodiment. For example, the power-throttling agent 219 may monitor utilization rates, load-balancing techniques, performance metrics (e.g., time to complete requests), QoS requirements, and user-defined low-utility threshold values for each of the various hardware components (e.g., 232, 240a, 240b, 241a, 241b, 242a, 242b, 243a, 243b, 244a, 244b, 245a, 245b, 211, 212, 250a, 250b, 251, 252, 253 or 254) in an embodiment. The load-balancing agent 216 may receive workload redistribution instructions identifying a load-balancing instruction determined by the power-throttling learning module 283 operating at the UEM platform 200 to reroute TO commands away from an underutilized hardware component and to alternative resources optimally selected for most likely to maintain QoS requirements at those other alternate hardware components (e.g., 232, 240a, 240b, 241a, 241b, 242a, 242b, 243a, 243b, 244a, 244b, 245a, 245b, 211, 212, 250a, 250b, 251, 252, 253 or 254) over a certain time period for execution at the data storage system/data center(s) 210 managed by an enterprise at one or more data centers.

The execution of code instructions of the power-throttling agent 219 in an embodiment may also be capable of assessing and adjusting policies within firmware for one or more hardware components, upon managing user approval. For example, the power-throttling agent 219 may also direct one or more hardware processors (e.g., 242a or 242b) of the one or more compute nodes (e.g., 240a or 240b, respectively), memory devices (e.g., managed drives 251, 252, 253, or 254, or storage arrays 250a or 250b), PCIe cards or other ASIC cards (e.g., 245a or 245b), or portions of fabric 212 (e.g., specific ports, routers, etc.) to power down or enter a sleep mode.

The execution of the code instructions of the power-throttling agent 219 of the data storage system/data center(s) 210 in an embodiment may transmit information recorded in such a way at any given time to the communication agent 281 of the RL based data center power consumption minimizing system 280 executing at the Unified Endpoint Management (UEM) platform 200. The operational telemetry measurements transmitted from the power-throttling agent 219 at the data storage system/data center 210 to the UEM platform 200 may further include, for example, various load-balancing actions or methods available for redistribution of workload within the data storage system/data center 210, and a user-specified low-utility threshold value and a Quality of Service (QoS) requirement for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254) of the data storage system/data center(s) 210, or for the data storage system/data center(s) 210 (e.g., data center) as a whole. For example, the managing user in an embodiment may employ a graphical user interface (GUI) (e.g., 215) at a management terminal 217 accessible by a managing user for the data storage system/data center(s) 210 to specify, for example, the low-utility threshold value (e.g., 0.1%, 1%, 2%, 5% of total utilization capacity). A Quality of Service (QoS) requirement such as a maximum allowable response time for processing an IO command (e.g., less than 1 ms, less than 2 ms) for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254) may be set by operational policy at 210 or be received from host information handling system 270 and host application 274 as a requirement to service those host applications 274.

The UEM platform 200 in an embodiment may gather this operational telemetry, like that described directly above, routinely from a plurality of hardware components (e.g., 232, 240a, 240b, 241a, 241b, 242a, 242b, 243a, 243b, 244a, 244b, 245a, 245b, 211, 212, 250a, 250b, 251, 252, 253 or 254) within the data storage system/data center(s) 210 operating in different geographic areas and under different usage patterns. The UEM platform 200 in an embodiment may execute an RL based data center power consumption minimizing system 280 to identify one or more groups of hardware components (e.g., memory components, processors, PCIe cards, other ASIC cards, fabric network paths) predicted to be underutilized at one or more data centers 210 during an upcoming time window. Execution of the RL based data center power consumption minimizing system 280 instructs the power-throttling agent 219 to power down one or more hardware components within those groups during the upcoming time window low-utilization period, and transmit to the load-balancing agent 216 a load-balancing instruction identified through reinforced learning as an optimal for rerouting any input/output (IO) commands directed to the underutilized component(s) to other alternative hardware components, while maintaining all QoS requirements for the data storage system/data center 210.

Each of these hardware components (e.g., 232, 240a, 240b, 241a, 241b, 242a, 242b, 243a, 243b, 244a, 244b, 245a, 245b, 211, 212, 250a, 250b, 251, 252, 253 or 254) of the data storage system/data center(s) 210 may be under management of or in communication with processors executing code instructions of a load balancing agent 216 and a power-throttling agent 219 in the data storage system/data center 210. The load-balancing agent 216 and the power-throttling agent 219 in an embodiment may act as interfaces between the data storage system/data center(s) 210 and the UEM platform 200.

The UEM platform 200 in an embodiment may operate as a cloud-based service in communication with the load balancing agent 216, via a network, to identify information technology (IT) issues at a plurality of components within the data storage system/data center(s) 210 within say, one or more data centers. The UEM platform 200 and local processors executing code instructions of a power-throttling agent 219, and load balancing agent 216 may also provide support for such issues, including automatically updating drivers or hardware components, as needed. In a specific embodiment of the present disclosure, the UEM platform 200 may gather operational telemetry measurements from various hardware components (e.g., 232, 240a, 240b, 241a, 241b, 242a, 242b, 243a, 243b, 244a, 244b, 245a, 245b, 211, 212, 250a, 250b, 251, 252, 253 or 254) of the data storage system/data center(s) 210 that describe operating environments for those hardware components (e.g., utilization rates, QoS requirements, user-specified low-utility threshold values) at one or more data centers.

A processor or processors at the UEM platform 200 execute code instructions of an RL based data center power consumption minimizing system 280 in an embodiment may use a time series utilization forecasting engine 286 that predicts a utilization rate for one or more hardware component groups (e.g., all memory devices, all processors, all PCIe cards or other ASIC cards) within a data storage system/data center 210, based on previously recorded utilization rates for each of such hardware component groups. The utilization forecasting engine 286 in an embodiment may be trained using algorithm code instructions based on operational telemetry measurements gathered by the power-throttling agent 219 over a training period. For example, the utilization forecasting engine 286 operating at the UEM platform information handling system 200 may use the operational telemetry measurements gathered from the power-throttling agent 219 discussed directly above during a training period in order to predict utilization rates (e.g., between zero and 100 percent capacity) during a given time window for one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) or one or more groups of hardware components (e.g., memory devices 250a, 250b, 251, 252, 253, 254, processors 242a or 242b, or various PCIe cards or other ASIC cards 245a, 245b, connecting one of a plurality of processors to one of a plurality of memory devices via fabric 212), based on previous utilization rates for those hardware components or hardware component groups. The utilization forecasting engine 286 in an embodiment may execute code instructions for any of several time series forecasting algorithms or models known in the art. For example, the utilization forecasting engine 286 in an embodiment may comprise executing code instructions for an autoregressive integrated moving average (AMIRA) time series forecasting model algorithm.

A power-throttling learning module 283 in an embodiment may also be trained using the training period operational telemetry to determine a probability that each available load-balancing instruction received within the operational telemetry will affect the ability of one or more data center hardware components to meet QoS requirements that may be required of IO commands from host applications 274. Each available load-balancing instruction in an embodiment may include redistributing a workload of one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) of a given hardware component type (e.g., memory devices 250a, 250b, 251, 252, 253, 254, processors 242a or 242b, or various PCIe cards or other ASIC cards 245a, 245b, connecting one of a plurality of processors to one of a plurality of memory devices via fabric 212) to alternative hardware components when powering down of the originally-targeted hardware components is determined for a low-utilization period. More specifically, a first memory-related load-balancing instruction may include diverting all IO commands targeting a single managed drive (e.g., 251) and redistributing those calls across all alternatives to that managed drive (e.g., 252, 253, and 254). As another example, a second memory-related load-balancing instruction may include diverting all IO commands targeting a single storage array (e.g., 250a) across all alternatives to that array (e.g., including 250b). In still other embodiments, memory-related load-balancing instructions may contemplate shifting the workload away from a plurality of managed drives (e.g., 251, 252, 253, or 254), a plurality of storage arrays (e.g., 250a, or 250b), or to a separate data center (e.g., 210) altogether. These memory-related load-balancing instructions in an embodiment may also include shifting workload from dynamic random access memory (DRAM) to a flash memory device, or vice versa.

In another example embodiment, a first processor-related load-balancing instruction may include diverting all IO commands targeting a single processor (e.g., 242a) and redistributing those calls across all alternatives to that processor (e.g., including 242b). As another example, a second processor-related load-balancing instruction may include diverting all IO commands targeting a single computing node (e.g., 240a) across all alternatives to that array (e.g., including 240b). As yet another example, a third processor-related load-balancing instruction may include diverting all IO commands targeting a single storage engine (e.g., 232) across all alternatives to that storage engine. In still other embodiments, processor-related load-balancing instructions may contemplate shifting the workload away from a plurality of processors (e.g., 242a and 242b), a plurality of compute nodes (e.g., 240a and 240b), a plurality of storage engines (e.g., including 232), or to a separate data center (e.g., 210) altogether. These processor-related load-balancing instructions in an embodiment may also include shifting workload from a central processing unit (CPU) to a graphics processing unit (GPU), or vice versa.

In still another example embodiment, a first fabric-related load-balancing instruction may include diverting all IO commands targeting a first portion of fabric 212, a first PCIe card (e.g., 245a), or a first ASIC card to a second portion of fabric 212, a second PCIe card (e.g., 245b), or a second ASIC card. These fabric-related load-balancing instructions in an embodiment may also include shifting workload among fabric network paths, PCIe cards (e.g., 245a or 245b), or other ASIC cards (e.g., 245a or 245b) dedicated to execution of particular tasks, such as encryption, deduplication, or compression.

As described herein, the power-throttling learning module 283 in an embodiment may be trained to determine, via execution of code instructions, a probability that each of these available load-balancing instructions will affect the ability of one or more data center hardware components to meet QoS requirements required from 10 commands, policies, or other requirements. The power-throttling learning module 283 may execute code instructions of a reinforcement learning (RL) method, such as code instructions for a Markov decision process algorithm, which may be executed within algorithms such as the Q-learning algorithm, State-Action-Reward-State-Action (SARSA) algorithm, Actor-Critic method algorithm, REINFORCE algorithm, Asynchronous Advantage Actor Critic (A3C) algorithm, or Deep Q-Learning algorithm, for example. Such code instructions executing RL methods involve inputs including an initial set of states for one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) or one or more groups of hardware components (e.g., memory devices 250a, 250b, 251, 252, 253, 254, processors 242*a* or 242*b*, or various PCIe cards or other ASIC cards connecting one of a plurality of processors to one of a plurality of memory devices via fabric 212). Other inputs for code instructions of such RL methods may include a set of actions each of the hardware components or groups of hardware components may take during execution of code instructions or IO commands, a consequent set of states for each of the hardware components or groups of hardware components that may result from execution of those actions, and a matrix of probabilities determined via execution of the algorithm code instructions that any given action may change the initial set of states to the consequent set of states.

The set actions available to each of the hardware components or groups of hardware components may comprise the available load-balancing instructions described directly above. Because execution of code instructions for the power-throttling learning module 283 identifies load-balancing instructions that will ensure QoS requirements for IO commands issued for each of the hardware components or groups of hardware components are met during execution of such load-balancing instructions, the set of states for each of the hardware components or groups of hardware components may comprise QoS requirements and performance metrics that may be analyzed to ensure such QoS requirements are met by alternative hardware components or groups of hardware components.

The power-throttling learning module 283 in an embodiment may be trained using training period operational telemetry measurements including the performance metrics and ability to meet QoS requirements by a plurality of data center hardware components (e.g., 232, 240*a*, 240*b*, 241*a*, 241*b*, 242*a*, 242*b*, 243*a*, 243*b*, 244*a*, 244*b*, 245*a*, 245*b*, 211, 212, 250*a*, 250*b*, 251, 252, 253 or 254) for IO commands, as affected by execution of each of the available load-balancing instructions to develop the probability matrix. Upon development of that matrix, the power-throttling learning module 283 may be further trained that consequent states (e.g., performance metrics of data center hardware component recorded after execution of a given load-balancing instruction) that meet the QoS requirements for all data center hardware components affected by the executed load-balancing instruction will be "rewarded" (e.g., associated with a value of positive one), and those that do not meet the QoS requirements for IO commands for any one of the data center hardware components affected will be "punished" (e.g., associated with a value of negative one). In such a way, the power-throttling learning module 283 in an embodiment may be trained to determine whether any given load-balancing instruction to divert workload away from a given hardware component or combination of hardware components will likely meet the QoS requirements of various IO commands from host information handling system 270 for all hardware components within the data storage system/data center 210.

During a monitoring period, following training of the utilization forecasting engine and the power-throttling learning module, the utilization forecasting engine may notify the power-throttling learning module that a utilization rate for a hardware component group (e.g., memory, processors, PCIe cards or other ASIC cards) is predicted to fall below a user-defined low-utilization threshold value. This may indicate a need to power down one or more data center hardware components within the predicted underutilized hardware group during this low-utilization time window. For example, a notification that memory hardware may be underutilized during an upcoming time window may indicate a need to switch off one or more managed drives (e.g., 251, 252, 253, or 254), or one or more storage arrays (e.g., 250*a*, 250*b*), of varying memory types (e.g., DRAM, flash). As another example, a notification that processor hardware may be underutilized during an upcoming time window may indicate a need to switch off one or more storage engines (e.g., 232), computing nodes (e.g., 240*a*, or 240*b*), or processors (e.g., 242*a*, or 242*b*) of varying processing unit types (e.g., CPU, GPU). As yet another example, a notification that fabric hardware, PCIe cards or other ASIC cards may be underutilized during an upcoming time window may indicate a need to switch off one or more fabric 212 network paths, PCIe cards, or other ASIC cards which may be devoted to specific types of tasks (e.g., encryption, compression, deduplication).

In turn, such a power-throttling of these underutilized hardware components may indicate a further need to reroute, via one of the available load-balancing instructions, any of the minimal workload expected at these underutilized hardware components to which power may be ceased to other alternative hardware components, or even to a different data center that is expected to maintain full power during the upcoming time window. The power-throttling learning module 283 in an embodiment may receive notification from the utilization forecasting engine 286 in an embodiment that a specific hardware group is predicted to be underutilized in an embodiment. In response, execution of code instructions of the power-throttling learning module 283 may identify a plurality of potential load-balancing instructions, within the available load-balancing instructions used to train the power-throttling learning module 283, that involve diverting workloads away from one or more data center hardware components falling within the hardware group predicted to be underutilized.

For example, the power-throttling learning module 283 may receive a notification that the processor hardware group is predicted to be underutilized at data storage system/data center 210 during an upcoming time window. In such an example embodiment, processor(s) at the UEM platform information handling system 200 executing code instructions of the power-throttling learning module 283 may identify one or more of the processor-related load-balancing instructions described herein as potential load-balancing instructions for diverting workload away from one or more storage engines (e.g., 232), one or more computing nodes (e.g., 240*a*, or 240*b*), or one or more processors (e.g., 240*a*, or 240*b*). The power-throttling learning module 283 in such an embodiment may then identify the potential load-balancing instructions that is most likely to meet all QoS requirements of the host application 284 or data center 210 policy for the data storage system/data center 210, based on the reward outputs from the execution of code instructions of the reinforcement learning algorithm described herein, as the recommended load-balancing instruction.

In another example embodiment, the power-throttling learning module 283 may receive a notification that the memory hardware group is predicted to be underutilized at data storage system/data center 210 during an upcoming time window. In such an example embodiment, processor(s) at the UEM platform information handling system 200 executing code instructions of the power-throttling learning module 283 may identify one or more of the memory-related load-balancing instructions described herein as potential load-balancing instructions for diverting workload away from one or more managed drives (e.g., 251, 252, 253, or 254), or one or more storage arrays (e.g., 250*a*, or 250*b*). The power-throttling learning module 283 in such an embodiment may then identify the potential load-balancing instructions that is most likely to meet all QoS requirements of the host application 284 or data center 210 policy for the data storage system/data center 210, based on the reward outputs from the execution of code instructions of the reinforcement learning algorithm described herein, as the recommended load-balancing instruction.

In still another example embodiment, the power-throttling learning module 283 may receive a notification that the fabric 212 network path, PCIe cards, other ASIC cards, or fabric hardware group is predicted to be underutilized at data storage system/data center 210 during an upcoming time window. In such an example embodiment, processor(s) at the UEM platform information handling system 200 executing code instructions of the power-throttling learning module 283 may identify one or more of the fabric-related load-balancing instructions described herein as potential load-balancing instructions for diverting workload away from a first portion of fabric 212 (e.g., port or router), a first PCIe card or first ASIC card, to a second portion of fabric 212, a second PCIe card or second ASIC card. The power-throttling learning module 283 in such an embodiment may then identify the potential load-balancing instructions that is most likely to meet all QoS requirements of the host application 284 or data center 210 policy for the data storage system/data center 210, based on the reward outputs from the execution of code instructions of the reinforcement learning algorithm described herein, as the recommended load-balancing instruction.

Upon such a determination of one or more potential load-balancing instructions, the power-throttling learning module may identify one or more hardware components within the predicted underutilized hardware component group whose workload may be diverted by the recommended load-balancing instruction. For example, the power-throttling learning module 283 may determine that the recommended load-balancing instruction diverts the workload from computing node 240*a* to computing node 240*b*. As another example, the power-throttling learning module 283 may determine that the recommended load-balancing instruction diverts the workload from processor 242*a* to another processor within computing node 240*a*. In other examples, the power-throttling learning module 283 may determine that the recommended load-balancing instruction diverts workload from a storage engine (e.g., 232). As another example, the power-throttling learning module 283 may determine that the recommended load-balancing instruction diverts the workload from managed drive 251 to managed drives 252, 253, and 254. As yet another example, the power-throttling learning module 283 may determine that the recommended load-balancing instruction diverts the workload from storage array 250*a* to storage array 250*b*. In still another example, the power-throttling learning module 283 may determine that the recommended load-balancing instruction diverts the workload from a first portion of fabric 212 (e.g., port or router), a first PCIe card or first ASIC card to a second portion of fabric 212, a second PCIe card, or a second ASIC card. In some embodiments, the hardware component to which the workload would be diverted may be housed within a separate data center than the data center housing the hardware component from which the workload would be diverted.

The power-throttling learning module 283 in an embodiment may then transmit to the power-throttling agent 219 at the data storage system/data center 210 the recommended load-balancing instruction and an instruction to power-down or place into sleep mode the one or more data center hardware components whose workloads will be diverted by the recommended load-balancing instruction. Upon receipt of these instructions in an embodiment, execution of code instructions by a processor at the data center 210 of the power-throttling agent 219 may power down the one or more data center hardware components whose workloads will be diverted by the recommended load-balancing instruction during the upcoming time window. This may decrease power consumed unnecessarily to keep this hardware component available, despite a low likelihood that the hardware component may be used, as indicated by the predicted low utilization rate for that component or group of hardware components. By decreasing unnecessary power consumption in such a way, the RL based data center power consumption minimizing system may decrease power consumed, and $CO_2$ emitted as a consequence due to supplying power to underutilized hardware components.

The power-throttling agent 219 may also transmit the recommended load-balancing instruction to the load-balancing agent 216 in an embodiment. The execution of code instructions by a processor at the data center 210 of load-balancing agent 216 may then execute the recommended load-balancing instruction to shift the workload for the hardware components that will be powered down during the upcoming time window, as described directly above, to alternate hardware components. For example, the power-throttling agent 219 and load-balancing agent 216 may divert the workload from computing node 240*a*, which may be powered down, to computing node 240*b*. As another example, the power-throttling agent 219 and load-balancing agent 216 may divert the workload from processor 242*a*, which may be powered down, to another processor within computing node 240*a*. In other examples, the power-throttling agent 219 and load-balancing agent 216 may divert workload from a storage engine (e.g., 232), which may be powered down, to another storage engine. As another example, the power-throttling agent 219 and load-balancing agent 216 may divert the workload from managed drive 251, which may be powered down, to managed drives 252, 253, and 254. As yet another example, the power-throttling agent 219 and load-balancing agent 216 may divert the workload from storage array 250*a*, which may be powered down, to storage array 250*b*. In still another example, the power-throttling agent 219 and load-balancing agent 216 may divert the workload from a first portion of fabric 212 (e.g., port or router), a first PCIe card or first ASIC card, which may be powered down, to a second portion of fabric 212, a second PCIe card, or a second ASIC card. In some embodiments, the hardware component to which the workload has been diverted may be housed within a separate data center than the data center housing the hardware component from which the workload has been diverted and which has been powered down. In such a way, and because the recommended load-balancing instruction has been predicted to be most likely to meet all QoS requirements for all hardware components within the data storage system/data center 210, the RL based data center power consumption minimizing system 280 may minimize power consumed by underutilized components of the data center 210, while simultaneously meeting all QoS requirements for the data center 210.

Execution of code instructions for the RL based data center power consumption minimizing system 280, including the utilization forecasting engine 286 and the power-throttling learning module 283 may identify data storage system/data center 210 hardware components that are predicted to be underutilized during an upcoming time window may cause powering down those components during the upcoming time window, and the algorithm code instructions are executed to use an RL-based method to identify a prediction for an optimal load-balancing instruction selected for rerouting any input/output (IO) commands directed to the underutilized component(s) to other alternative hardware components that will meet customer or user QoS requirements as described in embodiments above.

Figure 3A:
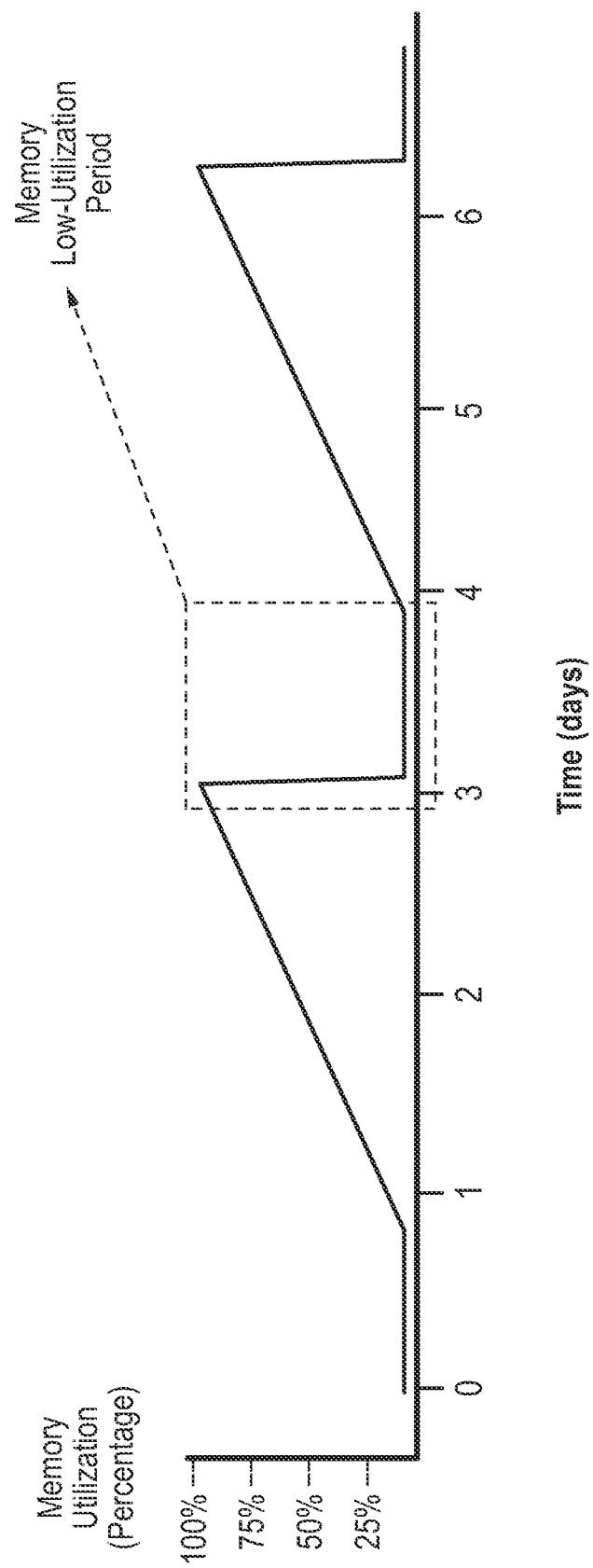
FIG. 3A is a graphical diagram illustrating a predicted memory utilization rate for a data storage system/data center according to an embodiment of the present disclosure.

FIG. 3A is a graphical diagram illustrating a predicted memory utilization rate for a data storage system/data center determined using a utilization forecasting engine according to an embodiment of the present disclosure. As described herein, execution of code instructions for the RL based data center power consumption minimizing system in an embodiment may train a time-series utilization forecasting engine to predict a future utilization rate for each of a plurality of data center hardware components by group (e.g., memory hardware, processors, fabric network paths, PCIe cards, or other ASIC cards), based on previously recorded utilization rates for each of the plurality of component groups. Execution of code instructions for such a trained utilization forecasting engine may then be used during a monitoring period to predict future utilization rates for each of these hardware component groups and to identify when such utilization rates may fall below a user-defined low-utilization threshold specific to each hardware component group.

FIG. 3A illustrates a predicted combined utilization rate for all memory hardware components (e.g., storage arrays 250a and 250b, and managed drives 251, 252, 253, and 254 as shown in FIG. 2) within a data storage system/data center (e.g., 210 of FIG. 2) over a monitoring period (e.g., 7 days). Monitoring periods may have any number of seconds, minutes, hours, days, months, etc., and may be set by a managing user in various embodiments described herein. As shown in FIG. 3A, the utilization forecasting engine (e.g., 286 of FIG. 2) may predict a period between days 3 and 4 in which the utilization rate for all of the memory hardware components combined may fall below a user-specified utilization threshold value (e.g., 5%, 1%, 0.1%, etc.).

Figure 3B:
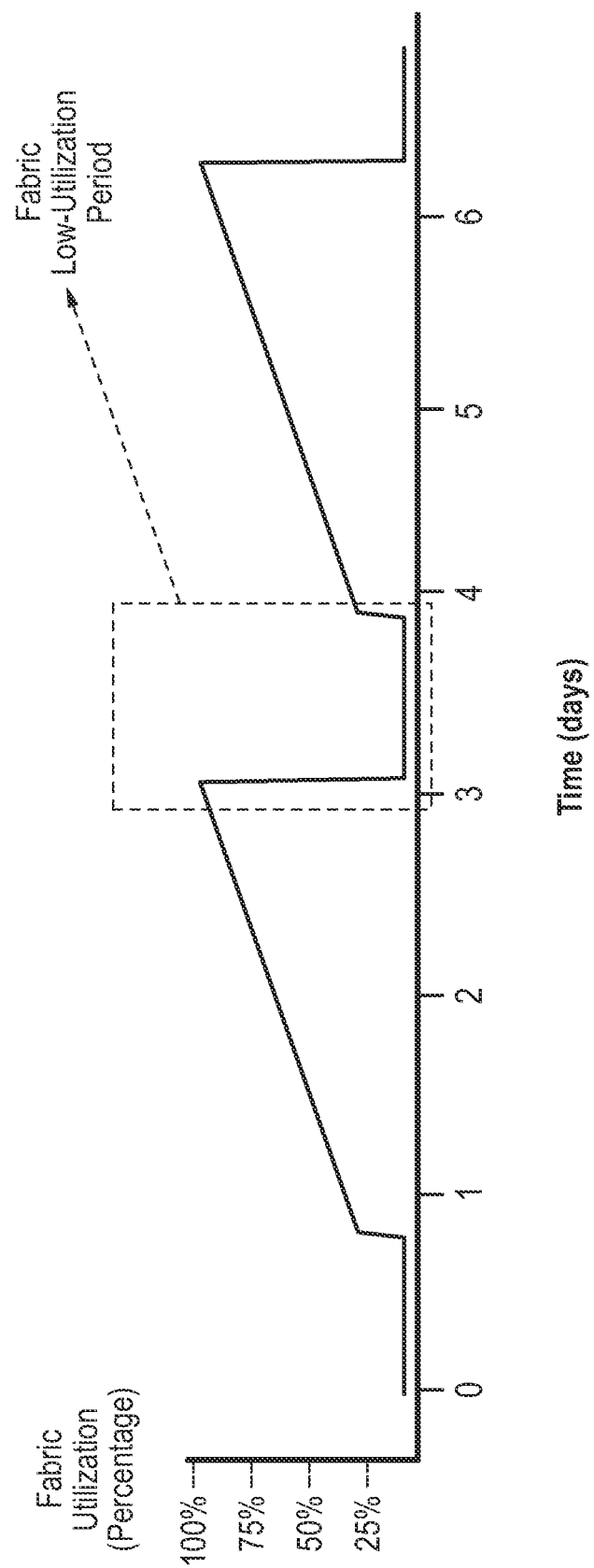
FIG. 3B is a graphical diagram illustrating a predicted fabric utilization rate for a data storage system/data center according to an embodiment of the present disclosure.

FIG. 3B is a graphical diagram illustrating a predicted data center fabric utilization rate for a data storage system/data center determined using code instructions of a trained utilization forecasting engine according to an embodiment of the present disclosure. FIG. 3B illustrates a predicted combined utilization rate for all peripheral component interconnect express (PCIe) cards or other application-specific integrated circuit (ASIC) cards, and subscriber line interface cards (SLIC) network paths within a data storage system/data center (e.g., 210 of FIG. 2) over a monitoring period (e.g., 7 days). As shown in FIG. 3B, the utilization forecasting engine (e.g., 286 of FIG. 2) may predict a period between days 3 and 4 in which the utilization rate for all of the PCIe cards or other ASIC cards combined may fall below a user-specified utilization threshold value (e.g., 5%, 1%, 0.1%, etc.).

Figure 3C:
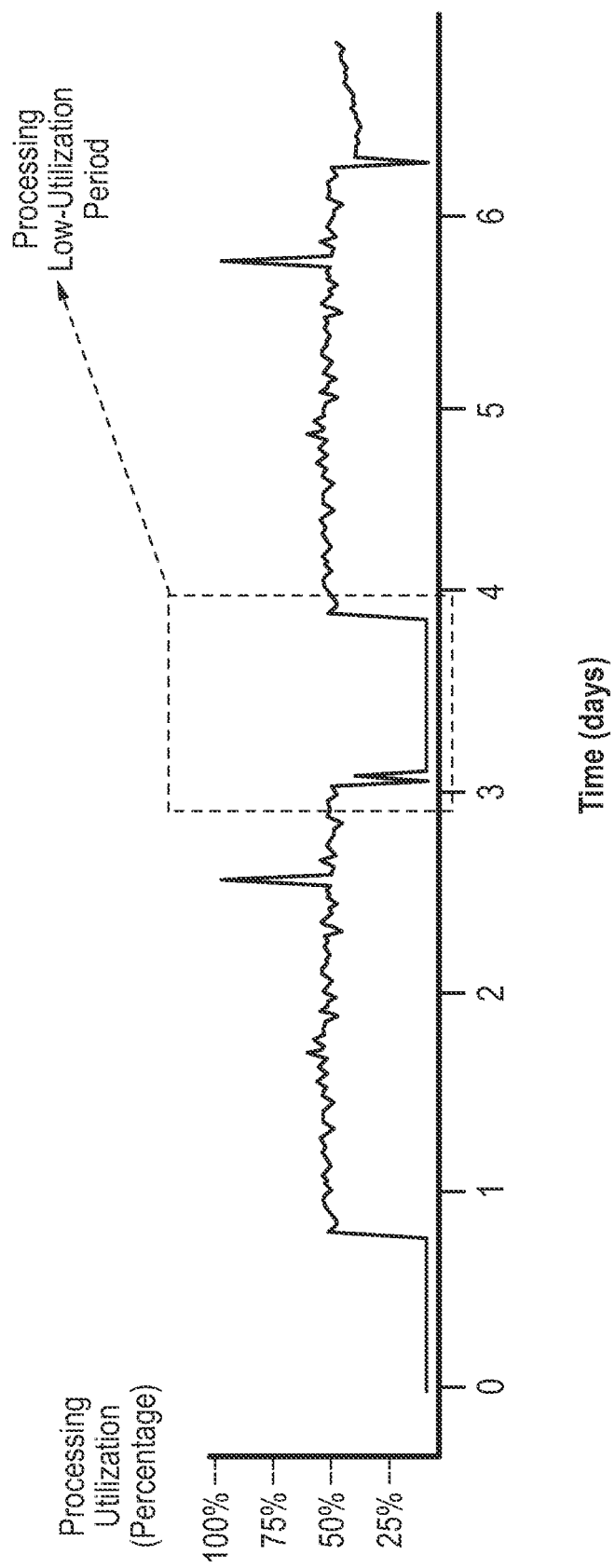
FIG. 3C is a graphical diagram illustrating a predicted processing utilization rate for a data storage system/data center according to an embodiment of the present disclosure.

FIG. 3C is a graphical diagram illustrating a predicted processing utilization rate for a data storage system/data center determined using a utilization forecasting engine according to an embodiment of the present disclosure. FIG. 3C illustrates a predicted combined utilization rate for all processing hardware components (e.g., computing nodes 240a and 240b, storage engine 232, or processors 242a or 242b) within a data storage system/data center (e.g., 210 of FIG. 2) over a monitoring period (e.g., 7 days). As shown in FIG. 3C, execution of code instruction for the trained utilization forecasting engine (e.g., 286 of FIG. 2) may predict a period between days 3 and 4 in which the utilization rate for all of the processors combined may fall below a user-specified utilization threshold value (e.g., 5%, 1%, 0.1%, etc.).

Figure 4:
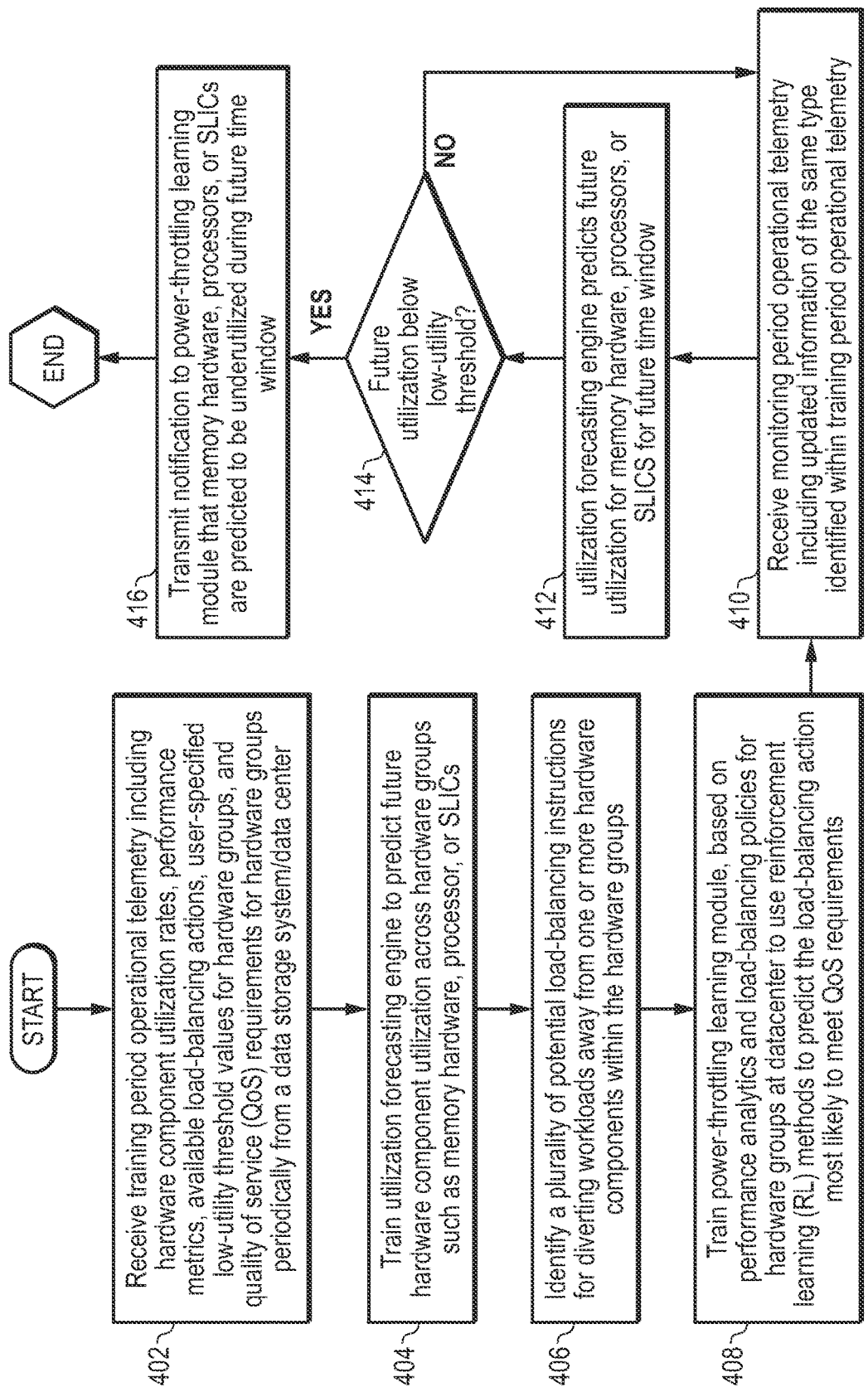
FIG. 4 is a flow diagram illustrating a method of training and using a utilization forecasting engine to predict a future time window in which one or more hardware component groups may be underutilized according to an embodiment of the present disclosure.

FIG. 4 is a flow diagram illustrating a method of training and using a utilization forecasting engine to predict a future time window in which one or more hardware component groups (e.g., memory hardware, processing hardware, networking hardware) may be underutilized, based on a user-specified utilization threshold value according to an embodiment of the present disclosure. As described herein, execution of code instructions of the reinforcement learning (RL) based data center power consumption minimizing system in an embodiment may identify hardware components that are predicted to be underutilized during an upcoming time window, power down those components during the upcoming time window, and use an RL-based method to identify an optimal load-balancing technique for rerouting any input/output (TO) commands directed to the underutilized component(s) to other alternative hardware components that may meet Quality of Service (QoS) requirements for satisfying those IO commands. The RL based data center power consumption minimizing system in an embodiment may train algorithm code instructions of a time-series utilization forecasting engine to predict a future utilization rate for each of a plurality of data center hardware components by group (e.g., memory hardware, processors, fabric network paths, PCIe cards, or other ASIC cards), based on previously recorded utilization rates for each of the plurality of component groups. Such code instructions for a trained utilization forecasting engine may then be used during a monitoring period to predict future utilization rates for each of these hardware component groups and to identify when such utilization rates may fall below a user-defined low-utilization threshold specific during a low utilization time window to each hardware component group.

At block 402, the RL based data center power consumption minimizing system in an embodiment may receive training period operational telemetry from a data center, including data center hardware component utilization rates, performance metrics relating to QoS metrics and other factors, available load-balancing actions, user-specified low-utility threshold value for hardware groups, and quality of service (QoS) requirements for hardware groups in responding to IO commands periodically. For example, in an embodiment described above with respect to FIG. 2, execution of code instructions for the power-throttling agent 219 at a data storage system/data center 210 may monitor utilization rates, load-balancing techniques, performance metrics (e.g., time to complete requests, latency, throughput, capacity, etc.), QoS requirements, and user-defined low-utility threshold values for each of the various hardware components (e.g., 232, 240a, 240b, 241a, 241b, 242a, 242b, 243a, 243b, 244a, 244b, 245a, 245b, 211, 212, 250a, 250b, 251, 252, 253 or 254) in an embodiment. The power-throttling agent 219 of the data storage system/data center(s) 210 in an embodiment may transmit information recorded in such a way at any given time to the communication agent 281 of the RL based data center power consumption minimizing system 280 executing at the Unified Endpoint Management (UEM) platform 200. The operational telemetry measurements transmitted from the power-throttling agent 219 to the UEM platform 200 may further include, for example, various load-balancing actions or methods available for redistribution of workload within the data storage system/data center 210, and a user-specified low-utility threshold value and a Quality of Service (QoS) requirement for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254) of the data storage system/data center(s) 210, or for the data storage system/data center(s) 210 (e.g., data center) as a whole. For example, the managing user in an embodiment may employ a graphical user interface (GUI) (e.g., 215) at a management terminal 217 accessible by a managing user for the data storage system/data center(s) 210 to specify, for example, the low-utility threshold value (e.g., 0.1%, 1%, 2%, 5% of total utilization capacity) and a Quality of Service (QoS) requirement such as a maximum allowable response time for processing an IO command (e.g., less than 1 ms, less than 2 ms) for one or more hardware components (e.g., 211, 212, 213, 214, 215, 216, 232, 240a, 240b, 241a, 241b, 242a, 242b, 243a, 243b, 244a, 244b, 245a, 245b, 250a, 250b, 251, 252, 253, or 254). Other QoS requirements may include maximum allowable latency, minimum throughput, minimum capacity for storage in memory or for processing via a hardware processor, for example.

The execution of code instructions for the RL based data center power consumption minimizing system in an embodiment may train a utilization forecasting engine to predict a future hardware component group utilization rate at block 404. For example, an RL based data center power consumption minimizing system 280 in an embodiment may use algorithmic code instructions for a time series utilization forecasting engine 286 that predicts a utilization rate for one or more hardware component groups (e.g., all memory devices, all processors, all PCIe cards or other ASIC cards) within a data storage system/data center 210, based on previously recorded utilization rates for each of such hardware component groups. The utilization forecasting engine 286 in an embodiment may be trained based on operational telemetry measurements gathered by the power-throttling agent 219 over a training period. For example, the utilization forecasting engine 286 operating at the UEM 200 may use the operational telemetry measurements gathered from the power-throttling agent 219 discussed directly above with respect to block 402 during a training period in order to predict utilization rates (e.g., between zero and 100 percent capacity) during a given time window for one or more hardware components (e.g., 232, 240a, 240b, 241a, 241b, 242a, 242b, 243a, 243b, 244a, 244b, 245a, 245b, 211, 212, 250a, 250b, 251, 252, 253 or 254) or one or more groups of hardware components (e.g., memory devices 250a, 250b, 251, 252, 253, 254, processors 242a or 242b, or various PCIe cards or other ASIC cards connecting one of a plurality of processors to one of a plurality of memory devices via fabric 212), based on previous utilization rates for those hardware components or hardware component groups. The utilization forecasting engine 286 in an embodiment may execute code instructions for any of several time series forecasting algorithms or models known in the art, including an autoregressive integrated moving average (AMIRA) time series forecasting model.

At block 406, the RL based data center power consumption minimizing system in an embodiment may identify a plurality of available load-balancing instructions for diverting workloads away from one or more hardware components within the hardware groups. As described herein, the execution of code instructions for the RL based data center power consumption minimizing system in an embodiment may aim to power down underutilized hardware components, which may require redistributing a small workload or any workload expected or not that would otherwise be directed to these underutilized hardware components upon powering down of these underutilized hardware components at block 406, the RL based data center power consumption minimizing system identifies all load-balancing instructions that are available for execution at the data storage system/data center to redistribute workloads among hardware components in each of the hardware groups (e.g., memory hardware, processing hardware, PCIe cards or other ASIC cards). Each available load-balancing instruction in an embodiment may include redistributing a workload intended for one or more hardware components of a given hardware component type (e.g., memory devices 250a, 250b, 251, 252, 253, 254, processors 242a or 242b, or various PCIe cards or other ASIC cards connecting one of a plurality of processors to one of a plurality of memory devices via fabric 212) to alternative hardware components. More specifically, a first memory-related load-balancing instruction may include diverting all IO commands targeting a single managed drive (e.g., 251) and redistributing those calls across all alternatives to that managed drive (e.g., 252, 253, and 254). As another example, a second memory-related load-balancing instruction may include diverting all IO commands targeting a single storage array (e.g., 250a) across all alternatives to that array (e.g., including 250b). In still other embodiments, memory-related load-balancing instructions may contemplate shifting the workload away from a plurality of managed drives (e.g., 251, 252, 253, or 254), a plurality of storage arrays (e.g., 250a, or 250b), or to a separate data center (e.g., 210) altogether. These memory-related load-balancing instructions in an embodiment may also include shifting workload from dynamic random access memory (DRAM) to a flash memory device, or vice versa.

In another example embodiment, a first processor-related load-balancing instruction may include diverting all IO commands targeting a single processor (e.g., 242a) and redistributing those calls across all alternatives to that processor (e.g., including 242b). As another example, a second processor-related load-balancing instruction may include diverting all IO commands targeting a single computing node (e.g., 240a) across all alternatives to that array (e.g., including 240b). As yet another example, a third processor-related load-balancing instruction may include diverting all IO commands targeting a single storage engine (e.g., 232) across all alternatives to that storage engine. In still other embodiments, processor-related load-balancing instructions may contemplate shifting the workload away from a plurality of processors (e.g., 242a and 242b), a plurality of compute nodes (e.g., 240a and 240b), a plurality of storage engines (e.g., including 232), or to a separate data center (e.g., 210) altogether. These processor-related load-balancing instructions in an embodiment may also include shifting workload from a central processing unit (CPU) to a graphics processing unit (GPU), or vice versa.

In still another example embodiment, a first fabric-related load-balancing instruction may include diverting all IO commands targeting a first portion of fabric 212 (e.g., port or router), a first PCIe card or first ASIC card and redistributing those calls to a second portion of fabric 212, a second PCIe card, or a second ASIC card. These fabric-related load-balancing instructions in an embodiment may also include shifting workload among fabric network paths, PCIe cards, or other ASIC cards dedicated to execution of particular tasks, such as encryption, deduplication, or compression.

The RL based data center power consumption minimizing system in an embodiment at block 408 may train the power-throttling learning module, based on performance analytics and load-balancing policies for hardware groups at the data center to use reinforcement learning (RL) methods to predict the load-balancing action most likely to meet QoS requirements for the IO commands from a host or from data center policy for hardware performance across the data center. For example, a power-throttling learning module 283 in an embodiment may be trained using the training period operational telemetry to determine a probability that each available load-balancing instruction, received within the training operational telemetry, will affect the ability of one or more data center hardware components to meet QoS requirements that may be required to serve TO commands or required by data center hardware performance QoS requirements. The power-throttling learning module 283 may execute code instructions of a reinforcement learning (RL) method on a UEM platform 200 processor that involves determining a matrix of probabilities that any given load-balancing instruction may result in change of performance metrics (e.g., processing time or response time, latency, throughput, capacity) for any given hardware component within the data center that may be required to serve TO commands or required by data center hardware performance QoS requirements.

The power-throttling learning module 283 in an embodiment may be trained using training period operational telemetry measurements including the performance metrics for hardware components indicating an ability to meet QoS requirements of TO commands received from host information handling systems or based on data center hardware performance requirements for a plurality of data center hardware components (e.g., 232, 240a, 240b, 241a, 241b, 242a, 242b, 243a, 243b, 244a, 244b, 245a, 245b, 211, 212, 250a, 250b, 251, 252, 253 or 254), as affected by execution of each of the available load-balancing instructions to develop the probability matrix. Upon development of that matrix, the power-throttling learning module 283 may be further trained that performance metrics of data center hardware components recorded after execution of a given load-balancing instruction that meet the QoS requirements from TO commands or data center hardware performance policy for the data center hardware components will be designated as "rewarded" (e.g., associated with a value of positive one) by the algorithmic code instructions. Those that do not meet the QoS requirements for any one of the data center hardware components affected will be designated as "punished" (e.g., associated with a value of negative one) by the algorithmic code instructions. In such a way, code instructions of the power-throttling learning module 283 in an embodiment may be trained to determine whether any given load-balancing instruction to divert workload away from a given hardware component or combination of hardware components will likely meet the QoS requirements from TO commands or data center hardware performance policy for hardware components within the data storage system/data center 210.

At block 410, the processor or processors executing code instructions of the RL based data center power consumption minimizing system at the UEM platform information handling system in an embodiment may receive monitoring period operational telemetry including updated information of the same type identified within the training period operational telemetry received at block 402. For example, following training of the utilization forecast engine 286 and the power-throttling learning module 283 in an embodiment, the power-throttling agent 219 at the data storage system/data center 210 may transmit updated operational telemetry, including performance metrics, and utilization rates to the RL based data center power consumption minimizing system 280.

The utilization forecasting engine in an embodiment at block 412 may predict a future utilization rate for one of the data center hardware component groups for one or more future time windows. As described herein, a utilization forecasting engine of the RL based data center power consumption minimizing system may predict a future utilization rate for each of a plurality of data center hardware components by group (e.g., memory hardware, processors, fabric network paths, PCIe cards, or other ASIC cards), based on previously recorded utilization rates for each of the plurality of component groups. Such execution of code instructions for the utilization forecasting engine may then be used to identify when such utilization rates may fall below a user-defined low-utilization threshold specific to each hardware component group.

For example, in an embodiment described with reference to FIG. 3A, the utilization forecasting engine may predict a period between days 3 and 4 in which the utilization rate for all of the memory hardware components combined may fall below a user-specified utilization threshold value (e.g., 5%, 1%, 0.1%, etc.). As another example, in an embodiment described with reference to FIG. 3B, the utilization forecasting engine (e.g., 286 of FIG. 2) may predict a period between days 3 and 4 in which the utilization rate for all of the PCIe cards or other ASIC cards combined may fall below a user-specified utilization threshold value (e.g., 5%, 1%, 0.1%, etc.). In yet another example, in an embodiment described with reference to FIG. 3C, the utilization forecasting engine (e.g., 286 of FIG. 2) may predict a period between days 3 and 4 in which the utilization rate for all of the processors combined may fall below a user-specified utilization threshold value (e.g., 5%, 1%, 0.1%, etc.).

At block 414, execution of code instructions for the utilization forecasting engine in an embodiment may determine whether the predicted future utilization rates for the data center hardware component groups falls below a user-defined low-utility threshold value. For example, the utilization forecasting engine in embodiments described with reference to FIGS. 3A, 3B, and 3C, respectively, may determine the predicted future utilization rates for the data center memory hardware, PCIe cards or other ASIC cards, or processing hardware, respectively falls below the user-defined low-utility threshold value. If the predicted future utilization rate for a data center hardware component group falls below the user-defined low-utility threshold value, this may indicate a need to power down one or more hardware components within that hardware group and redirect workload from that powered down component to an alternative hardware component via a load-balancing instruction. In such a case, the method may proceed to block 416 for identification of the predicted underutilized hardware component group to the power-throttling learning module for determination of an optimal load-balancing instruction. If the predicted future utilization rate for a data center hardware component group stays above the user-defined low-utility threshold value, this may indicate no need to power down any hardware components within the hardware group, and the method may proceed back to block 410 for continued monitoring.

In an embodiment in which the predicted future utilization rate for a data center hardware component group falls below the user-defined low-utility threshold value, the utilization forecasting engine at block 416 may transmit notification to the power-throttling learning module that one or more of the hardware component groups at the data center are predicted to be underutilized during a future time window. As described herein, this may indicate a need to power down one or more hardware components within that hardware group and redirect workload from that powered down component to an alternative hardware component via a load-balancing instruction. Execution of code instructions for the power-throttling learning module in such an embodiment may then determine an optimal load-balancing instruction for redirecting the workload as needed, as described in greater detail with respect to FIG. 5, below. In such a way, the RL based data center power consumption minimizing system in an embodiment may use the utilization forecasting engine to identify one or more hardware components that may be powered down to conserve power and minimize $CO_2$ emissions while still meeting all customer QoS requirements for the data storage system/data center. The method for training and using a utilization forecasting engine to predict a future time window in which one or more hardware component groups may be underutilized, based on a user-specified utilization threshold value may then end.

Figure 5:
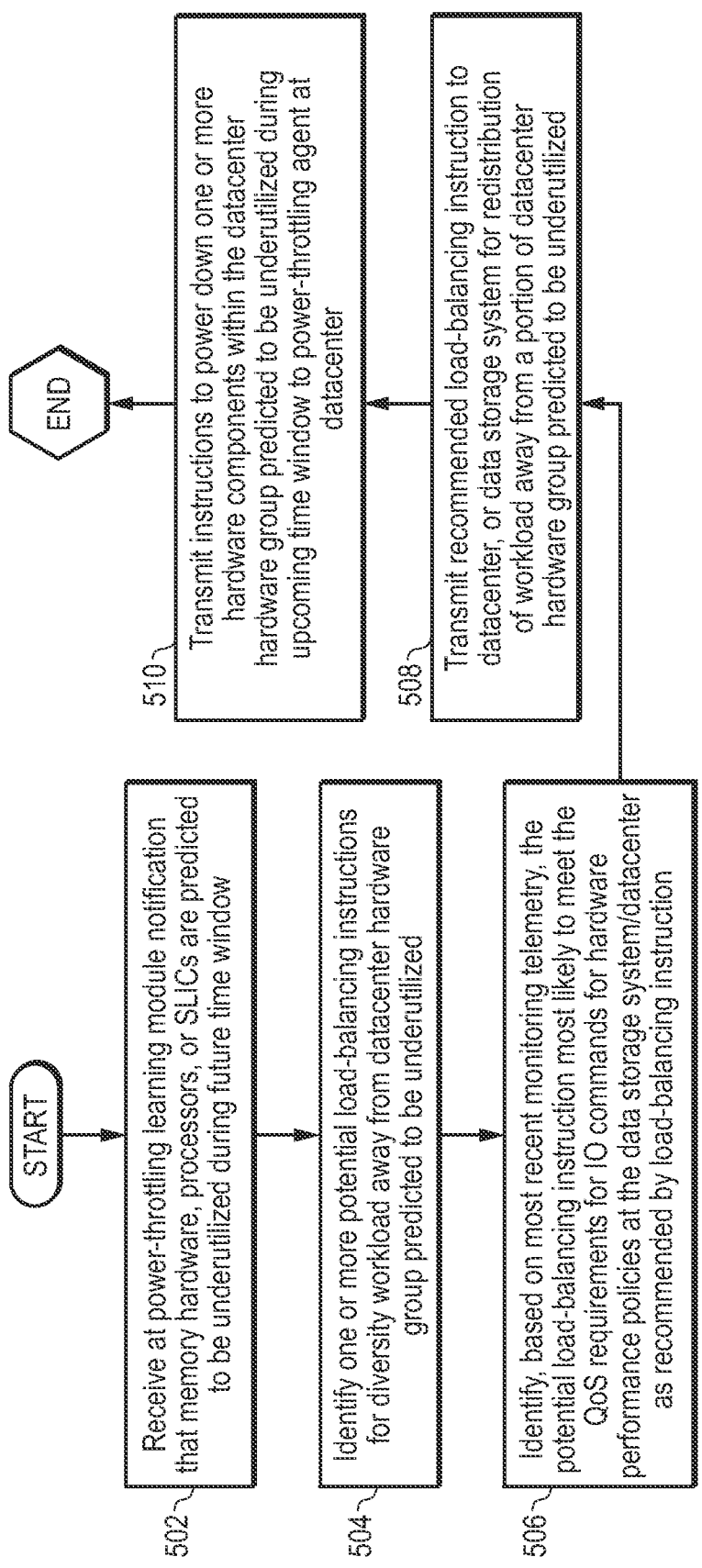
FIG. 5 is a flow diagram illustrating a method of determining an optimal load-balancing instruction for diverting a workload away from a data center hardware component predicted to be underutilized and to have capacity powered down according to an embodiment of the present disclosure.

FIG. 5 is a flow diagram illustrating a method of determining an optimal load-balancing instruction for diverting any workload, such as input/output (IO) commands from a host information handling system, away from a data center hardware component predicted to be underutilized during an upcoming time window and powered down. The optimal load-balancing instruction is determined such that it will result in satisfaction of all customer quality of service (QoS) requirements within the data storage system/data center upon diversion of workload to alternative hardware components according to an embodiment of the present disclosure. As described herein, the reinforcement learning (RL) based data center power consumption minimizing system in an embodiment may identify hardware components that are predicted to be underutilized during an upcoming time window, power down those components during the upcoming time window, and execute code instructions of an RL-based method to identify an optimal load-balancing technique for rerouting any IO commands directed to the underutilized component(s) to other alternative hardware components that can satisfy customer QoS requirements.

At block 502, the power throttling learning module may receive a notification from the utilization forecasting engine that one or more data center hardware groups are predicted to be underutilized during a future time window. For example, the power-throttling learning module executing at a unified endpoint management (UEM) platform may receive a notification, as described above with respect to block 416 of FIG. 4. Such a notification may indicate a future time window (e.g., between 3 and 4 days from now) in which the utilization rate for some or all of the memory hardware components, processing hardware components, PCIe cards, other ASIC cards, or fabric network paths combined may fall below a user-specified utilization threshold value (e.g., 5%, 1%, 0.1%, etc.). This may indicate a need to power down one or more hardware components within those hardware groups (e.g., memory hardware, processing hardware, fabric network paths, PCIe cards, other ASIC cards) and redirect workload from those powered down components to alternative hardware components via a load-balancing instruction.

The execution of code instructions of the power-throttling learning module in an embodiment at block 504 may identify one or more potential load-balancing instructions for diverting a workload away from one or more hardware components within the data center hardware group predicted by the utilization forecasting engine to be underutilized during the upcoming time window. For example, in an embodiment described with respect to FIG. 2, the power-throttling learning module 283 may receive a notification that some or all of the processor hardware group is predicted to be underutilized at data storage system/data center 210 during an upcoming time window. In such an example embodiment, the execution of code instructions for the power-throttling learning module 283 may identify one or more processor-related load-balancing instructions described herein as potential load-balancing instructions for diverting workload away from one or more storage engines (e.g., 232), one or more computing nodes (e.g., 240a, or 240b), or one or more processors (e.g., 240a, or 240b). More specifically, a first processor-related load-balancing instruction may include diverting all IO commands targeting a single processor (e.g., 242a) and redistributing those calls across all alternatives to that processor (e.g., including 242b). As another example, a second processor-related load-balancing instruction may include diverting all IO commands targeting a single computing node (e.g., 240a) across all alternatives to that array (e.g., including 240b). As yet another example, a third processor-related load-balancing instruction may include diverting all IO commands targeting a single storage engine (e.g., 232) across all alternatives to that storage engine. In still other embodiments, processor-related load-balancing instructions may contemplate shifting the workload away from a plurality of processors (e.g., 242a and 242b), a plurality of compute nodes (e.g., 240a and 240b), a plurality of storage engines (e.g., including 232), or to a separate data center (e.g., 210) altogether. These processor-related load-balancing instructions in an embodiment may also include shifting workload from a central processing unit (CPU) to a graphics processing unit (GPU), or vice versa.

In another example embodiment, the execution of code instructions of the power-throttling learning module 283 may receive a notification that one or more portions of the memory hardware group is predicted to be underutilized at data storage system/data center 210 during an upcoming time window. In such an example embodiment, the power-throttling learning module 283 may identify one or more memory-related load-balancing instructions described herein as potential load-balancing instructions for diverting workload away from one or more managed drives (e.g., 251, 252, 253, or 254), or one or more storage arrays (e.g., 250a, or 250b). More specifically, a first memory-related load-balancing instruction may include diverting all IO commands targeting a single managed drive (e.g., 251) and redistributing those calls across all alternatives to that managed drive (e.g., 252, 253, and 254). As another example, a second memory-related load-balancing instruction may include diverting all IO commands targeting a single storage array (e.g., 250a) across all alternatives to that array (e.g., including 250b). In still other embodiments, memory-related load-balancing instructions may contemplate shifting the workload away from a plurality of managed drives (e.g., 251, 252, 253, or 254), a plurality of storage arrays (e.g., 250a, or 250b), or to a separate data center (e.g., 210) altogether. These memory-related load-balancing instructions in an embodiment may also include shifting workload from dynamic random access memory (DRAM) to a flash memory device, or vice versa.

In still another example embodiment, the execution of code instructions for the power-throttling learning module 283 may receive a notification that one or more portions of the fabric network path or fabric hardware group is predicted to be underutilized at data storage system/data center 210 during an upcoming time window. In such an example embodiment, the power-throttling learning module 283 may identify one or more fabric-related load-balancing instructions described herein as potential load-balancing instructions for diverting workload away from a first portion of fabric 212, a first PCIe card, or a first ASIC card to a second portion of fabric 212, a second PCIe card, or a second ASIC card. More specifically, a first fabric-related load-balancing instruction may include diverting all IO commands targeting aa first portion of fabric 212, a first PCIe card (e.g., 245a), or a first ASIC card to a second portion of fabric 212, a second PCIe card (e.g., 245b), or a second ASIC card. These fabric-related load-balancing instructions in an embodiment may also include shifting workload among fabric network paths, PCIe cards, or other ASIC cards dedicated to execution of particular tasks, such as encryption, deduplication, or compression.

At block 506, execution of code instructions for the power-throttling learning module at the UEM platform in an embodiment may identify, based on the most recent monitoring telemetry, the potential load-balancing instruction most likely to meet QoS requirements for any IO commands from a host information handling system or hardware performance policies set for the data storage system/data center as the recommended load-balancing instruction. As described herein, the power-throttling learning module 283 may be trained to determine whether any given load-balancing instruction to divert workload away from a given hardware component or combination of hardware components will likely meet the QoS requirements for any JO commands from a host information handling system or hardware performance policies set for all hardware components within the data storage system/data center 210. In an example embodiment in which the power-throttling learning module 283 receives a notification that memory hardware is predicted to be underutilized during an upcoming time window, the power-throttling learning module 283 may identify one or more memory-related load-balancing instructions that may meet the QoS requirements for any JO commands from a host information handling system or hardware performance policies set for the data storage system/data center 210, or which may be associated with a high reward value (e.g., positive one). As another example in which the power-throttling learning module 283 receives a notification that processing hardware is predicted to be underutilized during an upcoming time window, the power-throttling learning module 283 may identify one or more processing-related load-balancing instructions that may meet the QoS requirements for any JO commands from a host information handling system or hardware performance policies set for the data storage system/data center 210, or which may be associated with a high reward value (e.g., positive one). In still another example embodiment in which the power-throttling learning module 283 receives a notification that fabric, PCIe cards, other ASIC cards, or fabric network path hardware is predicted to be underutilized during an upcoming time window, the power-throttling learning module 283 may identify one or more fabric-related load-balancing instructions that may meet the QoS requirements for any IO commands from a host information handling system or hardware performance policies set for the data storage system/data center 210, or which may be associated with a high reward value (e.g., positive one). Load-balancing instructions that may be associated with a high reward value (e.g., positive one) in various embodiments described herein may be those that meet any of a number of QoS requirements, including, for example, maximum latency, minimum throughput, or minimum capacity.

The power-throttling learning module in an embodiment may transmit the recommended load-balancing instruction to the data storage system/data center at block 508 for redistribution of workload away from a portion of the data center hardware group predicted to be underutilized. For example, in an embodiment in which the power-throttling learning module 283 receives a notification that memory hardware is predicted to be underutilized during an upcoming time window, the power-throttling learning module 283 may transmit a memory-related load-balancing instruction to alternative memory hardware, meeting the QoS requirements for the data storage system/data center 210, that is also associated with a high reward value (e.g., positive one), instead of other memory-related load-balancing instructions being sent to the power-throttling agent 219 of the data center 210 that may not satisfy customer QoS requirements. In another example embodiment in which the power-throttling learning module 283 receives a notification that processing hardware is predicted to be underutilized during an upcoming time window, the power-throttling learning module 283 may transmit a processor-related load-balancing instruction, meeting the QoS requirements for the data storage system/data center 210, that is also associated with a high reward value (e.g., positive one), instead of other processor-related load-balancing instructions that have low reward values associated with them to the power-throttling agent 219 of the data center 210. In yet another example embodiment in which the power-throttling learning module 283 receives a notification that fabric, PCIe cards, other ASIC cards, or fabric network path hardware is predicted to be underutilized during an upcoming time window, the power-throttling learning module 283 may transmit a fabric-related load-balancing instruction, meeting the QoS requirements for the data storage system/data center 210, that is also associated with a high reward value (e.g., positive one), instead of other fabric-related load-balancing instructions that have low reward values associated with them to the power-throttling agent 219 of the data center 210.

At block 510, execution of code instructions of the power-throttling learning module in an embodiment may transmit an instruction to the power-throttling agent at the data storage system/data center to power down or place in sleep mode one or more hardware components of the data center within the data center hardware group predicted to be underutilized during the upcoming time window. For example, the power-throttling learning module 283 in an embodiment in which the utilization forecasting engine 286 predicts under-utilization of memory hardware may transmit an instruction to power down or limit the amount of power delivered to one or more memory hardware components from which a workload may be diverted by the recommended load-balancing instruction transmitted at block 508.

More specifically, the power-throttling learning module 283 may determine, in one example, that the recommended load-balancing instruction diverts the workload from computing node 240a to computing node 240b. As another example, the power-throttling learning module 283 may determine that the recommended load-balancing instruction diverts the workload from processor 242a to another processor within computing node 240a. In other examples, the power-throttling learning module 283 may determine that the recommended load-balancing instruction diverts workload from a storage engine (e.g., 232). As another example, the power-throttling learning module 283 may determine that the recommended load-balancing instruction diverts the workload from managed drive 251 to managed drives 252, 253, and 254. As yet another example, the power-throttling learning module 283 may determine that the recommended load-balancing instruction diverts the workload from storage array 250a to storage array 250b. In still another example, the power-throttling learning module 283 may determine that the recommended load-balancing instruction diverts the workload from a first portion of fabric 212, a first PCIe card (e.g., 245a), or a first ASIC card to a second portion of fabric 212, a second PCIe card (e.g., 245b), or a second ASIC card.

The power-throttling learning module 283 in an embodiment may then transmit to the power-throttling agent 219 at the data storage system/data center 210 the recommended load-balancing instruction and an instruction to power-down or place into sleep mode the one or more data center hardware components whose workloads will be diverted by the recommended load-balancing instruction. In such a way, the RL based data center power consumption minimizing system in an embodiment may predict and decrease power consumed and CO2 emitted by underutilized data center hardware components, while continuing to meet all QoS requirements for the data center hardware components remaining fully powered. The method for determining an optimal load-balancing instruction for diverting a workload away from a data center hardware component predicted to be underutilized during an upcoming time window that will result in satisfaction of all customer quality of service (QoS) requirements within the data storage system/data center may then end.

Figure 6:
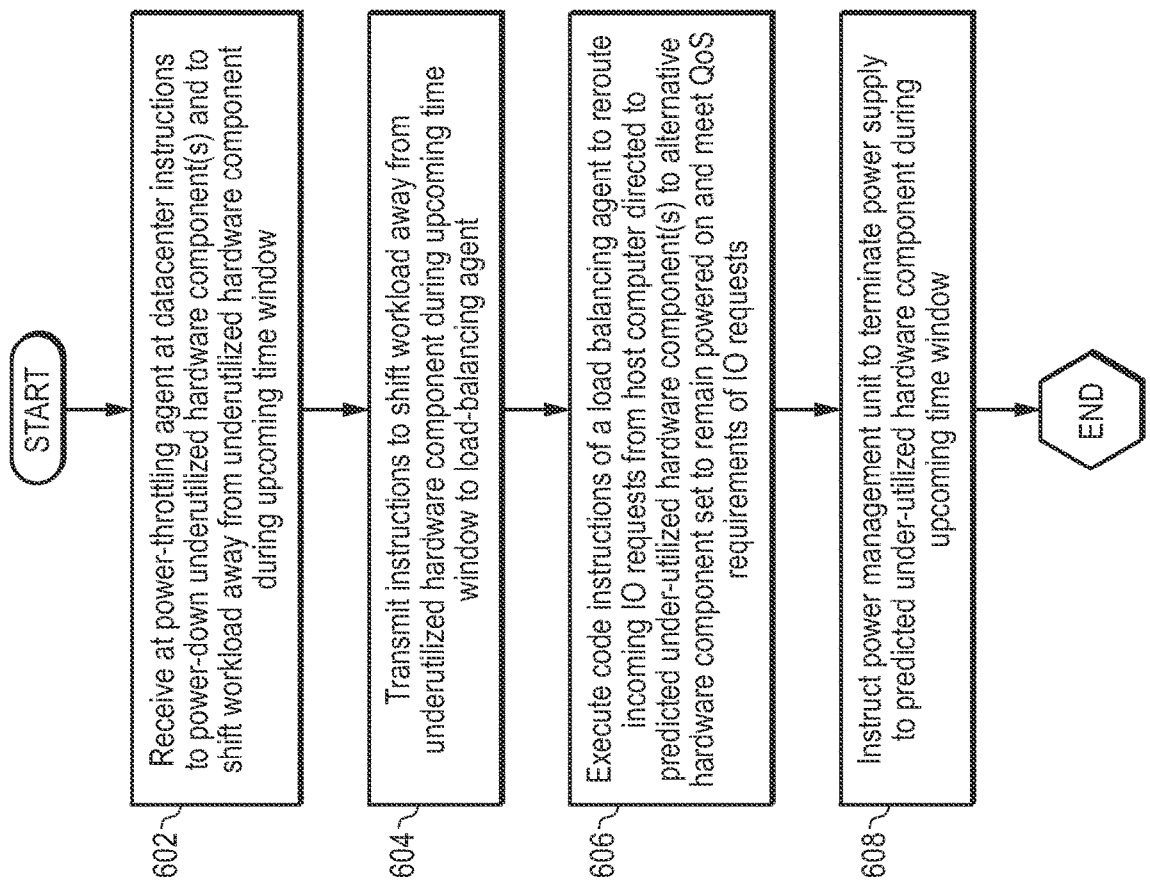
FIG. 6 is a flow diagram illustrating a method of limiting power supplied to a hardware component at a data storage system/data center according to an optimal load-balancing instruction according to an embodiment of the present disclosure.

FIG. 6 is a flow diagram illustrating a method of limiting power supplied to a hardware component at a data storage system/data center according to an optimal load-balancing instruction identified by execution of code instructions of a power-throttling learning module to decrease CO2 emissions according to an embodiment of the present disclosure. As described herein, execution of code instructions for the reinforcement learning (RL) based data center power consumption minimizing system in an embodiment may identify hardware components that are predicted to be underutilized during an upcoming time window and instruct a data storage system/data center to power down those components during the upcoming time window, and to select and execute an optimal load-balancing instruction for rerouting any input/output (IO) commands directed to the underutilized component(s) to other alternative hardware components that may serve customer QoS requirements for the IO commands.

At block 602, the power-throttling agent executing at a data storage system/data center in an embodiment may receive instructions to power down an underutilized hardware component and to shift workload away from the underutilized hardware component during an upcoming time window. For example, in an embodiment described above with respect to FIG. 5, at block 510, the power-throttling learning module of the RL based data center power consumption minimizing system at a unified endpoint management (UEM) platform information handling system may transmit an instruction to power down one or more hardware components within the data center hardware group predicted to be underutilized during the upcoming time window to a power-throttling agent at the data center. At block 508 of the same FIG. 5, as another example, the power-throttling learning module may transmit the recommended or optimal load-balancing instruction to the data storage system/data center for redistribution of the workload away from a portion of the data center hardware group predicted to be underutilized. More specifically, in an embodiment described with reference to FIG. 2, the power-throttling agent 219 executing at a processor at the data storage system/data center 210 may receive such instructions from the power-throttling learning module 283 of the RL based data center power consumption minimizing system 280 operating at the Unified Endpoint Management (UEM) platform 200.

In specific examples, such instructions may include a first instruction to throttle power supplied to computing node 240a and a second instruction to divert workload from computing node 240a to computing node 240b. As another example, such instructions may include a first instruction to throttle power supplied to processor 242a and a second instruction to divert the workload from processor 242a to another processor within computing node 240a. In other examples, such instructions may include a first instruction to throttle power supplied to storage engine 232 and a second instruction to divert workload from a storage engine (e.g., 232). As another example, such instructions may include a first instruction to throttle power supplied to managed drive 251 and a second instruction to divert the workload from managed drive 251 to managed drives 252, 253, and 254. As yet another example, such instructions may include a first instruction to throttle power supplied to storage array 250a and a second instruction to divert the workload from storage array 250a to storage array 250b. In still another example, such instructions may include a first instruction to throttle power supplied to a first portion of fabric 212, a first PCIe card (e.g., 245a), or a first ASIC card to a second portion of fabric 212, a second PCIe card (e.g., 245b), or a second ASIC card.

The power-throttling agent at a data center in an embodiment at block 604 may transmit the instruction to shift the workload away from the underutilized hardware component during the upcoming time window to a load-balancing agent of the data center. For example, the power-throttling agent 219 in an embodiment may transmit the recommended or optimal load-balancing instruction received from the power-throttling learning module 283 to the load-balancing agent 216 for execution to divert workload intended for the underutilized hardware component to an alternate hardware component that may satisfy customer QoS requirements.

The load-balancing agent in an embodiment at block 606 may execute the recommended or optimal load-balancing instruction to reroute incoming IO requests from a host computer directed to the predicted under-utilized hardware component(s) to alternative hardware components set to remain powered on and which may satisfy the IO requests QoS requirements. For example, the load balancing agent 216 in an embodiment may execute the recommended or optimal load balancing instruction received at block 602 from the power-throttling learning module 283 to reroute incoming IO requests from a host computer 270 directed to predicted under-utilized hardware component(s) of the data center 210. More specifically, the load balancing agent 216 may execute the recommended or optimal load balancing instruction to divert workload from computing node 240a to computing node 240b. As another example, the load balancing agent 216 may execute the recommended or optimal load balancing instruction to divert the workload from processor 242a to another processor within computing node 240a. In other examples, the load balancing agent 216 may execute the recommended or optimal load balancing instruction to divert workload from a storage engine (e.g., 232). As another example, the load balancing agent 216 may execute the recommended or optimal load balancing instruction to divert the workload from managed drive 251 to managed drives 252, 253, and 254. As yet another example, the load balancing agent 216 may execute the recommended or optimal load balancing instruction to divert the workload from storage array 250a to storage array 250b. In still another example, the load balancing agent 216 may execute the recommended or optimal load balancing instruction to divert the workload from a first portion of fabric 212, a first PCIe card (e.g., 245a), or a first ASIC card to a second portion of fabric 212, a second PCIe card (e.g., 245b), or a second ASIC card.

The power-throttling agent in an embodiment may terminate or limit power supply to the predicted under-utilized hardware component during the upcoming time window at block 608. For example, the power-throttling agent 219 in an embodiment may terminate or limit power supply to the computing node 240a. As another example, the power-throttling agent 219 in an embodiment may terminate or limit power supply to the processor 242a. In other examples, the power-throttling agent 219 in an embodiment may terminate or limit power supply to the storage engine 232. As another example, the power-throttling agent 219 in an embodiment may terminate or limit power supply to the managed drive 251. As yet another example, the power-throttling agent 219 in an embodiment may terminate or limit power supply to the storage array 250a. In still another example, the power-throttling agent 219 in an embodiment may terminate or limit power supply to a first portion of fabric 212, a first PCIe card (e.g., 245a), or a first ASIC card. In such a way, the RL based data center power consumption minimizing system in an embodiment may predict and decrease power consumed and CO2 emitted by underutilized data center hardware components, while continuing to meet all QoS requirements for the data center hardware components remaining fully powered. The method for limiting power supplied to a hardware component at a data storage system/data center according to an optimal load-balancing instruction identified by a power-throttling learning module to decrease CO2 emissions may then end.

The blocks of the flow diagrams of FIGS. 4, 5, and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a reinforcement learning (RL) based data center power consumption minimizing system may comprise:
    a network interface device receiving operational telemetry measurements for a plurality of data center processors forming a data center processing system, including data center hardware performance metrics, data center hardware utilization metrics, and a user-specified low-utility threshold value;
    a hardware processor executing code instructions of a forecasting engine to predict a future time window in which a data center hardware utilization rate for the data center processing system executing a future workload falls below the user-specified low-utility threshold value;
    the hardware processor executing code instructions of the RL based data center power consumption minimizing system to identify an optimal load-balancing instruction for redistributing the future workload across an optimal first portion of the data center processing system associated with a high reward value based on quality of service (QoS) requirements for input/output (TO) commands directed to the data center processing system; and
    the network interface device transmitting the optimal load-balancing instruction to shift the future workload to the optimal first portion of the data center processing system predicted to meet QoS requirements for the IO commands redirected pursuant to the optimal load-balancing instruction; and
    the network interface device transmitting an instruction to throttle power supplied to a second portion of the data center processing system.

2. The information handling system of claim 1, wherein the RL based data center power consumption minimizing system executes code instructions of a Q-learning algorithm.

3. The information handling system of claim 1, wherein the optimal load-balancing instruction shifts the future workload to the first portion of the data center processing system that is a first data center processing engine from the second portion of the data center processing system that is a second data center processing engine within a data center.

4. The information handling system of claim 1, wherein the optimal load-balancing instruction shifts the future workload to the first portion of the data center processing system that is a first data center computing node from the second portion of the data center processing system that is a second data center computing node within a data center.

5. The information handling system of claim 1, wherein the optimal load-balancing instruction shifts the future workload to the first portion of the data center processing system that is a central processing unit (CPU) from the second portion of the data center processing system that is a graphics processing unit (GPU) within a data center.

6. The information handling system of claim 1, wherein the optimal load-balancing instruction shifts the future workload to the first portion of the data center processing system that is a graphics processing unit (GPU) from the second portion of the data center processing system that is a central processing unit (CPU) within a data center.

7. The information handling system of claim 1, wherein the optimal first portion of the data center processing system is located at a first data center and the second portion of the data center processing system is located at a second data center.

8. A reinforcement learning (RL) based method for minimizing power consumption by data center hardware components may comprise
receiving, via a network interface device, operational telemetry measurements for a plurality of data center memory hardware components, including data center hardware performance metrics, data center hardware utilization metrics, and a user-specified low-utility threshold value;
predicting, via a hardware processor executing code instructions of a forecasting engine, a future time window in which a data center hardware utilization rate for the plurality of data center memory hardware components executing a future workload falls below the user-specified low-utility threshold value;
identifying, via the hardware processor executing code instructions of the RL based data center power consumption minimizing system, an optimal load-balancing instruction for redistributing the future workload across an optimal first portion of the plurality of data center memory hardware components associated with a high reward value based on quality of service (QoS) requirements for input/output (TO) commands directed to the plurality of data center memory hardware components;
transmitting, via the network interface device, the optimal load-balancing instruction to shift the future workload to the optimal first portion of the plurality of data center memory hardware components predicted to meet QoS requirements for the IO commands redirected pursuant to the optimal load-balancing instruction; and
transmitting, via the network interface device, an instruction to throttle power supplied to a second portion of the plurality of data center memory hardware components.

9. The method of claim 8, wherein the RL based data center power consumption minimizing system executes code instructions of a State-Action-Reward-State-Action (SARSA) algorithm.

10. The method of claim 8, wherein the plurality of data center memory hardware components includes one or more data storage arrays.

11. The method of claim 8, wherein the plurality of data center memory hardware components includes one or more managed drives.

12. The method of claim 8, wherein the optimal load-balancing instruction shifts the future workload to the first portion of the plurality of data center memory hardware components that are one or more dynamic random access memory hardware components from the second portion of the plurality of data center memory hardware components that are one or more flash memory devices.

13. The method of claim 8, wherein the optimal load-balancing instruction shifts the future workload to the first portion of the plurality of data center memory hardware components that are one or more flash memory devices components from the second portion of the plurality of data center memory hardware components that are one or more dynamic random access memory hardware.

14. The method of claim 8, wherein the first portion of the plurality of data center memory hardware components is located at a first data center and are able to meet the QoS requirements, and the second portion of the plurality of data center memory hardware components is located at a second data center.

15. An information handling system executing a reinforcement learning (RL) based data center power consumption minimizing system may comprise:
a network interface device to receive operational telemetry measurements for a plurality of data center computing node back-end communication adapters, including data center hardware performance metrics, data center hardware utilization metrics, and a user-specified low-utility threshold value;
a hardware processor to execute code instructions of a forecasting engine to predict a future time window in which a data center hardware utilization rate for the plurality of computing node back-end communication adapters executing a future workload falls below the user-specified low-utility threshold value;
the hardware processor to execute code instructions of the RL based data center power consumption minimizing system to identify an optimal load-balancing instruction for redistributing the future workload across a first portion of the plurality of computing node back-end communication adapters associated with a high reward value based on quality of service (QoS) requirements for input/output (TO) commands directed to the plurality of compute node back-end communication adapters; and
the network interface device to transmit the optimal load-balancing instruction to shift the future workload to an optimal first portion of the plurality of computing node back-end communication adapters predicted to meet QoS requirements for the IO commands redirected pursuant to the optimal load-balancing instruction; and
the network interface device to transmit an instruction to throttle power supplied to a second portion of the plurality of computing node back-end communication adapters.

16. The information handling system of claim 15, wherein the RL based data center power consumption minimizing system executes code instructions of an Actor-Critic algorithm.

17. The information handling system of claim 15, wherein one or more of the second portion of the computing node back-end communication adapters are dedicated to execution of deduplication tasks.

18. The information handling system of claim 15, wherein one or more of the second portion of the computing node back-end communication adapters are dedicated to execution of encryption tasks.

19. The information handling system of claim 15, wherein one or more of the second portion of the computing node back-end communication adapters are dedicated to execution of compression tasks.

20. The information handling system of claim 15, wherein one or more of the second portion of the computing node back-end communication adapters are peripheral component interconnect express (PCIe) cards.

* * * * *